US012580868B2

(12) United States Patent
Dou et al.

(10) Patent No.: US 12,580,868 B2
(45) Date of Patent: Mar. 17, 2026

(54) DATA TRANSMISSION METHOD AND APPARATUS

(71) Applicant: HUAWEI TECHNOLOGIES CO., LTD., Shenzhen (CN)

(72) Inventors: Shengyue Dou, Shenzhen (CN); Jingwang Ma, Shenzhen (CN); Shuri Liao, Shenzhen (CN); Kedi Wu, Shenzhen (CN); Yuejun Wei, Shenzhen (CN); Zhenfei Tang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 435 days.

(21) Appl. No.: 18/166,486

(22) Filed: Feb. 9, 2023

(65) Prior Publication Data

US 2023/0188472 A1 Jun. 15, 2023

Related U.S. Application Data

(63) Continuation of application No. PCT/CN2020/126749, filed on Nov. 5, 2020.

(30) Foreign Application Priority Data

Aug. 19, 2020 (WO) ................ PCT/CN2020/110092

(51) Int. Cl.
*H04L 47/2483* (2022.01)
*H04L 69/22* (2022.01)

(52) U.S. Cl.
CPC .......... *H04L 47/2483* (2013.01); *H04L 69/22* (2013.01); *H04L 2212/00* (2013.01)

(58) Field of Classification Search
CPC . H04L 47/2483; H04L 69/22; H04L 2212/00; H04L 63/029; H04W 28/0252;
(Continued)

(56) References Cited

U.S. PATENT DOCUMENTS

2015/0201345 A1* 7/2015 Zhang ................... H04W 72/23
370/252
2016/0133230 A1 5/2016 Daniels et al.
(Continued)

FOREIGN PATENT DOCUMENTS

CN 108833937 A 11/2018
CN 110011952 A 7/2019
(Continued)

OTHER PUBLICATIONS

3GPP TS 23.501 V16.5.1 (Aug. 2020), 3rd Generation Partnership Project; Technical Specification Group Services and System Aspects; System architecture for the 5G System (5GS); Stage 2(Release 16), 440 pages.
(Continued)

*Primary Examiner* — Shawn D Miller

(57) ABSTRACT
This application provides a data transmission method and an apparatus. In the method, a first data unit is received from a server or a data network, wherein the first data unit comprises first identification information and second identification information, a target transmission requirement corresponding to the first data unit is obtained based on the first identification information, protocol data encapsulation is performed on the first data unit based on the target transmission requirement, to obtain a second data unit that comprises third identification information related to the second identification information; and the second data unit is sent to an access network device.

19 Claims, 7 Drawing Sheets

(58) Field of Classification Search
    CPC ............. H04W 28/0268; H04W 76/12; H04W
                                                28/0263
    See application file for complete search history.

(56)                    References Cited

U.S. PATENT DOCUMENTS

| | | | | |
|---|---|---|---|---|
| 2016/0212654 | A1* | 7/2016 | Itoh | H04W 88/12 |
| 2017/0317894 | A1* | 11/2017 | Dao | H04L 41/5009 |
| 2019/0132251 | A1 | 5/2019 | Dao et al. | |
| 2021/0117360 | A1* | 4/2021 | Kutch | G06F 3/0656 |

FOREIGN PATENT DOCUMENTS

| | | | |
|---|---|---|---|
| CN | 110428215 | A | 11/2019 |
| CN | 110691381 | A | 1/2020 |
| WO | 2020036928 | A1 | 2/2020 |
| WO | 2020088528 | A1 | 5/2020 |

OTHER PUBLICATIONS

Qualcomm Incorporated Proposed Updates to BaselineTeclmolo-
gies TSG SA=4#107 meeting Tdoc S4-200042,Jan. 24, 2020, total
39 pages.
Qualcomm Incorporated Proposed Updates to TR26 .918based on
AHVIC 215 3GPP SA4 Video SWG Telco on FS_5GXR#3 AHVIC-
220, 19.112019, total 109 pages.
3GPP TS 24.501 V16.5.1 (Jul. 2020), 3rd Generation Partnership
Project;Technical Specification Group Core Network and
Terminals;Non-Access-Stratum (NAS) protocol for 5G System
(5GS);Stage 3;(Release 16), 708 pages.

* cited by examiner

118

128

110

120

114

124

100

911

912

900

Antenna

Control circuit

Memory        Processor

Input/Output apparatus

1000

Storage module
1003

Transceiver module
1001

Processing module
1002

DATA TRANSMISSION METHOD AND APPARATUS

CROSS-REFERENCE TO RELATED APPLICATIONS

This application is a continuation of International Application No. PCT/CN2020/126749, filed on Nov. 5, 2020, which claims priority to International Application No. PCT/CN2020/110092, filed on Aug. 19, 2020. The disclosures of the aforementioned applications are hereby incorporated by reference in their entireties.

TECHNICAL FIELD

This application relates to the field of communication technologies, and in particular, to a data transmission method and an apparatus.

BACKGROUND

In a wireless communication network, an extended reality (extended reality, XR) technology has advantages such as multi-view and strong interaction, can provide brand-new visual experience for a user, and has a great application value and great business potential. XR includes technologies such as virtual reality (virtual reality, VR), augmented reality (augmented reality, AR), and mixed reality (mix reality, MR), and can be widely applied to many fields such as entertainment, gaming, healthcare, advertising, industry, online education, a tactile internet, and engineering.

A feature of XR data is that there is a specific dependency between data. For example, a video picture frame in XR data may be generally divided into a plurality of data packets. If a data packet in the plurality of data packets fails to be transmitted, it is possible that the entire video picture frame cannot be correctly received. For another example, in a tactile internet, information such as video information, tactile information, and control information has dependent synchronization requirements. When transmission of a type of information is lost or delayed, an overall service effect and user experience are affected.

Therefore, when XR data having a dependency is transmitted, how to meet a synchronization requirement between data to improve user experience on an XR service becomes an urgent problem to be resolved.

SUMMARY

Embodiments of this application provide a data transmission method and an apparatus.

According to a first aspect, an embodiment of this application provides a data transmission method. The method may be performed by a user plane network element or a fixed network device, or may be performed by a component (such as a processor, a chip, or a chip system) of a user plane network element or a fixed network device. The method includes: receiving a first data unit from a server or a data network, where the first data unit includes first identification information and second identification information; obtaining, based on the first identification information, a target transmission requirement corresponding to the first data unit; performing protocol data encapsulation on the first data unit based on the target transmission requirement, to obtain a second data unit including third identification information, where the third identification information is related to the second identification information; and sending the second data unit to an access network device. Optionally, the first data unit is a data packet, and the data packet may be, for example, obtained after the server encodes and/or renders source data of XR. Optionally, the second data unit is a quality of service (quality of service, QoS) flow.

According to the method, integrity transmission can be performed on data or information that has a synchronization requirement or a dependency, to meet the synchronization requirement between the data or information. Therefore, user experience on an XR service is improved.

With reference to the first aspect, in some implementations of the first aspect, the first identification information identifies the first data unit. For example, the first identification information includes packet flow description (packet flow description, PFD) information of the first data unit or other index information or identifier (identifier, ID) information that can identify the first data unit. In this implementation, the first data unit can be received and identified, and requirement information corresponding to the first data unit can be obtained based on the first identification information.

With reference to the first aspect, in some implementations of the first aspect, the second identification information includes integrity index information. Data information included in first data units having same integrity index information may be subsequently transmitted as a whole on an access network device side. In this way, data information included in first data units may be subsequently transmitted as a whole on the access network device side. Therefore, user experience on XR data is improved.

With reference to the first aspect, in some implementations of the first aspect, two or more first data units having same second identification information may correspond to data of a same picture frame. In this way, data information included in a plurality of first data units corresponding to a same picture frame may be subsequently transmitted as a whole on the access network device side. Therefore, user experience on a video picture is improved.

With reference to the first aspect, in some implementations of the first aspect, two or more first data units having same second identification information may correspond to a same piece of slice (slice) data or a same piece of tile (tile) data in a picture frame. In this way, the same piece of slice data or the same piece of tile data may be subsequently transmitted as a whole on the access network device side. Therefore, user experience on a video picture is improved.

With reference to the first aspect, in some implementations of the first aspect, two or more first data units having same second identification information may correspond to basic layer data and enhancement layer data of a same picture frame. In this way, data information included in a plurality of first data units corresponding to basic layer data and enhancement layer data of a same picture frame may be subsequently transmitted as a whole on the access network device side. Therefore, user experience on a video picture is improved.

With reference to the first aspect, in some implementations of the first aspect, two or more first data units having same second identification information may correspond to data of a picture frame and audio data synchronized with the picture frame. In this way, data information included in a plurality of first data units corresponding to data of a picture frame and audio data synchronized with the picture frame may be subsequently transmitted as a whole on the access network device side. Therefore, user experience on audio and video synchronization is improved.

With reference to the first aspect, in some implementations of the first aspect, two or more first data units having same second identification information may correspond to data of a same task, a same event, a same object, or a same type. For example, for a tactile internet, one or more of action information, tactile information, a picture frame, audio information, or the like may be used as data of a same task, a same event, a same object, or a same type. In this way, data information included in a plurality of first data units corresponding to data of a same task, a same event, a same object, or a same type may be subsequently transmitted as a whole on the access network device side. Therefore, user experience, for example, on a tactile internet service is improved.

With reference to the first aspect, in some implementations of the first aspect, the target transmission requirement includes an integrity transmission requirement. Data information included in first data units having the integrity transmission requirement is subsequently transmitted as a whole on the access network device side. Therefore, user experience on XR data is improved.

With reference to the first aspect, in some implementations of the first aspect, two or more first data units having same second identification information may correspond to data of a same picture frame. When these first data units have the target transmission requirement, data information included in these first data units is subsequently transmitted as a whole on the access network device side. Therefore, user experience on a video picture is improved.

With reference to the first aspect, in some implementations of the first aspect, two or more first data units having same second identification information may correspond to a same piece of slice (slice) data or a same piece of tile (tile) data in a picture frame. When these first data units have the target transmission requirement, data information included in these first data units is subsequently transmitted as a whole on the access network device side. Therefore, user experience on a video picture is improved.

With reference to the first aspect, in some implementations of the first aspect, two or more first data units having same second identification information may correspond to basic layer data and enhancement layer data of a same picture frame. When these first data units have the target transmission requirement, data information included in these first data units is subsequently transmitted as a whole on the access network device side. Therefore, user experience on a video picture is improved.

With reference to the first aspect, in some implementations of the first aspect, two or more first data units having same second identification information may correspond to data of a picture frame and audio data synchronized with the picture frame. When these first data units have the target transmission requirement, data information included in these first data units is subsequently transmitted as a whole on the access network device side. Therefore, user experience on audio and video synchronization is improved.

With reference to the first aspect, in some implementations of the first aspect, two or more first data units having same second identification information may correspond to data of a same task, a same event, a same object, or a same type. For example, for a tactile internet, one or more of action information, tactile information, a picture frame, audio information, or the like may be used as data of a same task, a same event, a same object, or a same type. When these first data units have the target transmission requirement, data information included in these first data units is subsequently transmitted as a whole on the access network device side. Therefore, user experience, for example, on a tactile internet service is improved.

With reference to the first aspect, in some implementations of the first aspect, the first data unit further includes fifth identification information, and the fifth identification information identifies a quantity of data units that are transmitted as a whole. The data units that are transmitted as a whole may include the first data unit. For example, the fifth identification information may include integrity quantity identification information, where the integrity quantity identification information identifies a quantity of data units that are transmitted as a whole.

With reference to the first aspect, in some implementations of the first aspect, the first data unit further includes sixth identification information, and the sixth identification information identifies a frame, a slice, or a tile to which data units that are transmitted as a whole belong. The data units that are transmitted as a whole may include the first data unit. For example, the sixth identification information may include one or more of integrity frame identification information, integrity slice identification information, or integrity tile identification information. The integrity frame identification information identifies a frame to which data units that are transmitted as a whole belong, the integrity slice identification information identifies a slice to which data units that are transmitted as a whole belong, and the integrity tile identification information identifies a tile to which data units that are transmitted as a whole belong.

With reference to the first aspect, in some implementations of the first aspect, the first data unit further includes seventh identification information, and the seventh identification information identifies a total size of data units that are transmitted as a whole. The data units that are transmitted as a whole may include the first data unit. For example, the seventh identification information may include integrity size identification information, where the integrity size identification information identifies a total size of data units that are transmitted as a whole.

With reference to the first aspect, in some implementations of the first aspect, there is a first correspondence between the target transmission requirement and the first identification information. The obtaining, based on the first identification information, a target transmission requirement corresponding to the first data unit may specifically include: obtaining the target transmission requirement based on the first identification information and the first correspondence. Optionally, the first correspondence may be predefined, or may be obtained from a session management network element. Optionally, the first correspondence is included in a data packet detection rule (packet detection rule, PDR). The session management network element may obtain the first correspondence from the server via a network capability exposure network element and/or a policy control network element. In this manner, the target transmission requirement can be obtained more conveniently.

With reference to the first aspect, in some implementations of the first aspect, the second data unit may further include fourth identification information, where the fourth identification information identifies the second data unit. For example, when the second data unit is a QoS flow, the fourth identification information may be a quality of service flow identifier (QoS flow identifier, QFI) identifying the QoS flow. In this implementation, the second data unit can be received and identified, and QoS requirement information corresponding to the first data unit can be obtained based on the fourth identification information.

With reference to the first aspect, in some implementations of the first aspect, the third identification information includes a data packet group identifier (packet group ID, PGID). Data information included in second data units that include the data packet group ID is subsequently transmitted as a whole on the access network device side. Therefore, user experience on XR data is improved.

With reference to the first aspect, in some implementations of the first aspect, the third identification information in the second data unit is related to the second identification information in the first data unit. It may be understood as that the third identification information is set based on the second identification information. In a possible implementation, second data units obtained by performing protocol data encapsulation on first data units having same second identification information have same third data identifiers.

For example, two or more first data units having same second identification information may correspond to data of a same picture frame. When these first data units have the target transmission requirement, second data units obtained by performing protocol data encapsulation on these first data units may include same third identification information. Data information included in these second data units including same third identification information is subsequently transmitted as a whole on the access network device side. Therefore, user experience on a video picture is improved.

For another example, two or more first data units having same second identification information may correspond to a same piece of slice (slice) data or a same piece of tile (tile) data in a picture frame. When these first data units have the target transmission requirement, second data units obtained by performing protocol data encapsulation on these first data units may include same third identification information. Data information included in these second data units including same third identification information is subsequently transmitted as a whole on the access network device side. Therefore, user experience on a video picture is improved.

For another example, two or more first data units having same second identification information may correspond to basic layer data and enhancement layer data of a same picture frame. When these first data units have the target transmission requirement, second data units obtained by performing protocol data encapsulation on these first data units may include same third identification information. Data information included in these second data units including same third identification information is subsequently transmitted as a whole on the access network device side. Therefore, user experience on a video picture is improved.

For another example, two or more first data units having same second identification information may correspond to data of a picture frame and audio data synchronized with the picture frame. When these first data units have the target transmission requirement, second data units obtained by performing protocol data encapsulation on these first data units may include same third identification information. Data information included in these second data units including same third identification information is subsequently transmitted as a whole on the access network device side. Therefore, user experience on audio and video synchronization is improved.

For another example, two or more first data units having same second identification information may correspond to data of a same task, a same event, a same object, or a same type. When these first data units have the target transmission requirement, second data units obtained by performing protocol data encapsulation on these first data units may include same third identification information. Data information included in these second data units including same third identification information is subsequently transmitted as a whole on the access network device side. Therefore, user experience, for example, on a tactile internet service is improved.

With reference to the first aspect, in some implementations of the first aspect, the second data unit includes protocol header information, and the third identification information is included in the protocol header information. For example, when protocol data encapsulation is performed on the first data unit to obtain the second data unit, the protocol header information may be added, and the third identification information is included in the protocol header information. Optionally, the protocol header information is general packet radio service (general packet radio service, GPRS) tunneling protocol (GPRS tunneling protocol, GTP) header information. When protocol data encapsulation is performed on the first data unit according to GTP, the third identification information may be included in the GTP header information. For example, the third identification information may be included in an extended header part in the GTP header information. Because the access network device may parse out content in the GTP header information, the access network device may obtain the third identification information. Therefore, the access network device is enabled to perform, based on the third identification information, integrity transmission on second data units including same third identification information. This meets a synchronization requirement between data or information.

With reference to the first aspect, in some implementations of the first aspect, when the first data unit includes the fifth identification information, the second data unit obtained by performing protocol data encapsulation on the first data unit further includes eighth identification information, where the eighth identification information is related to the fifth identification information, and the eighth identification information identifies a quantity of data units that are transmitted as a whole. The data units that are transmitted as a whole may include the second data unit. For example, the eighth identification information includes data packet group number (packet group number, PGN) identification information, where the PGN identification information identifies a quantity of data packets that are transmitted as a whole.

With reference to the first aspect, in some implementations of the first aspect, when the first data unit includes the sixth identification information, the second data unit obtained by performing protocol data encapsulation on the first data unit further includes ninth identification information, where the ninth identification information is related to the sixth identification information, and the ninth identification information identifies a frame, a slice, or a tile to which data units that are transmitted as a whole belong. The data units that are transmitted as a whole may include the second data unit. For example, the ninth identification information includes one or more of a data packet group frame identifier (packet group frame ID, PGFID), a data packet group slice identifier (packet group slice ID, PGSID), or a data packet group tile identifier (packet group tile ID, PGTID). The PGFID identifies a frame to which data packets that are transmitted as a whole belong, the PGSID identifies a slice to which data packets that are transmitted as a whole belong, and the PGTID identifies a tile to which data packets that are transmitted as a whole belong.

With reference to the first aspect, in some implementations of the first aspect, when the first data unit includes the seventh identification information, the second data unit obtained by performing protocol data encapsulation on the first data unit further includes tenth identification information, where the tenth identification information is related to the seventh identification information, and the tenth identification information identifies a total size of data units that are transmitted as a whole. The data units that are transmitted as a whole may include the second data unit. For example, the tenth identification information includes data packet group bit size (packet group bit size, PGBS) identification information, where the PGBS identification information identifies a total bit size (which may alternatively be understood as a total quantity of bits) of data packets that are transmitted as a whole.

With reference to the first aspect, in some implementations of the first aspect, an execution body of the method provided in the first aspect may process the first data unit and/or send the second data unit based on one or more of the fifth identification information, the sixth identification information, or the seventh identification information included in the first data unit.

In a possible implementation, the execution body of the method provided in the first aspect discards or sends a received data unit based on the fifth identification information. For example, the fifth identification information includes the integrity quantity identification information, where the integrity quantity identification information identifies a quantity of to-be-transmitted data packets that are transmitted as a whole (which is referred to as a quantity of to-be-transmitted data packets for short). The execution body of the method provided in the first aspect compares a quantity of received data packets that are transmitted as a whole (which is referred to as a quantity of received data packets for short) with the quantity of to-be-transmitted data packets. When the quantity of the received data packets is less than the quantity of the to-be-transmitted data packets, the execution body of the method provided in the first aspect discards the received data packets that are transmitted as a whole. When the quantity of the received data packets is equal to the quantity of the to-be-transmitted data packets, the execution body of the method provided in the first aspect sends the received data packets that are transmitted as a whole.

In this implementation, data transmission that does not contribute to XR data experience can be reduced. Therefore, a waste of transmission resources is reduced and transmission resource usage efficiency is improved.

In another possible implementation, the execution body of the method provided in the first aspect determines, based on the sixth identification information, a sequence of transmitting data units. For example, the sixth identification information includes one or more of the integrity frame identification information, the integrity slice identification information, or the integrity tile identification information. The execution body of the method provided in the first aspect determines, based on one or more of the integrity frame identification information, the integrity slice identification information, or the integrity tile identification information, a sequence of sending data packets. In this implementation, data transmission scheduling can be optimized based on correlation of video frames, video slices, or video tiles, to improve user experience on XR data.

In another possible implementation, the execution body of the method provided in the first aspect determines a priority of transmitting data units based on the seventh identification information (which may also be understood as determining a preferentially transmitted data unit). For example, the seventh identification information includes the integrity size identification information. The execution body of the method provided in the first aspect determines, based on the integrity size identification information, a priority of sending data packets to the access network device, in other words, determines data packets to be preferentially sent to the access network device. In this implementation, a data transmission requirement with a high priority can be met. Therefore, user experience on XR data is improved.

According to a second aspect, an embodiment of this application provides a data transmission method. The method may be performed by an access network device, or may be performed by a component (for example, a processor, a chip, or a chip system) of an access network device. The method includes: receiving a second data unit from a user plane network element, and obtaining third identification information and fourth identification information in the second data unit; obtaining, based on the fourth identification information, QoS profile (profile) information corresponding to the second data unit; and outputting/sending the second data unit to a terminal based on the third identification information and the QoS profile information.

According to the method, the access network device can implement, on an air interface, bound transmission of data that has a synchronization requirement or a dependency, to implement an effect of integrity transmission, improve network transmission efficiency, and improve user experience on an XR service.

With reference to the second aspect, in some implementations of the second aspect, there is a second correspondence between the QoS profile information and the fourth identification information. The obtaining, based on the fourth identification information, QoS profile information corresponding to the second data unit specifically includes: obtaining, based on the fourth identification information in the second data unit and the second correspondence, the QoS profile information corresponding to the second data unit. Optionally, the second correspondence may be predefined, or may be obtained from a mobility management network element. The mobility management network element may obtain the second correspondence from a session management network element. In this manner, the QoS profile information can be obtained more conveniently.

With reference to the second aspect, in some implementations of the second aspect, the QoS profile information includes attribute information of a target transmission requirement, and the attribute information of the target transmission requirement indicates that there is the target transmission requirement. The attribute information of the target transmission requirement may be integrity transmission indication information, where the integrity transmission indication information indicates that integrity transmission needs to be performed on a corresponding QoS flow. Therefore, data information included in the QoS flow on which integrity transmission needs to be performed is transmitted as a whole. Therefore, user experience on XR data is improved.

With reference to the second aspect, in some implementations of the second aspect, the QoS profile information includes a 5G QoS identifier (5G QoS identifier, 5QI) that indicates 5G QoS attribute information, the 5G QoS attribute information includes attribute information of a target transmission requirement, and the attribute information of the target transmission requirement indicates that there is the target transmission requirement. The attribute information of the target transmission requirement may be integrity transmission indication information, where the integrity transmission indication information indicates that integrity transmission needs to be performed on a corresponding QoS flow. Therefore, data information included in the QoS flow on which integrity transmission needs to be performed is transmitted as a whole. Therefore, user experience on XR data is improved.

With reference to the second aspect, in some implementations of the second aspect, the QoS profile information may further include one or more of the following information: allocation and retention priority (allocation and retention priority, ARP) information, guaranteed flow bit rate (guaranteed flow bit rate, GFBR) information, maximum flow bit rate (maximum flow bit rate, MFBR) information, notification control information, maximum packet loss rate (maximum packet loss rate, MPLR) information, or reflective QoS attribute (reflective QoS attribute, RQA) information. In this implementation, more flexible and diversified QoS configurations can be obtained, to adapt to transmission of more services with different requirements.

With reference to the second aspect, in some implementations of the second aspect, the 5G QoS attribute information may further include one or more of the following information: resource type information, priority information, packet delay budget (packet delay budget, PDB) information, packet error rate (packet error rate, PER) information, average window information, or maximum data burst volume information. In this implementation, more flexible and diversified QoS configuration attributes can be obtained, to adapt to transmission of more services with different requirements.

With reference to the second aspect, in some implementations of the second aspect, when the QoS profile information indicates a target transmission requirement, integrity transmission is performed on second data units having same third identification information. The second data units having same third identification information may be transmitted by using a plurality of different integrity transmission methods.

For example, two or more second data units having same third identification information are transmitted on a same radio bearer. In this manner, an access network can perform overall scheduling on the two or more second data units, to improve user experience on a video.

For another example, if two or more second data units have same third identification information, these second data units are preferentially scheduled. In this manner, an access network can set different priorities for different services, to improve user experience on multimedia services.

For another example, if two or more second data units have same third identification information, and a part of the second data units is successfully transmitted, and a remaining part of the second data units fail to be transmitted, a second data unit that fails to be transmitted is preferentially scheduled. In this manner, it can be ensured, through scheduling, that a second data unit that fails to be transmitted can be preferentially transmitted reliably, to avoid a problem of invalid transmission of a second data unit that is successfully transmitted due to wrong transmission of a part of second data units.

With reference to the second aspect, in some implementations of the second aspect, the third identification information includes a data packet group identifier (packet group ID, PGID). Data information included in second data units that include the data packet group ID is transmitted as a whole. Therefore, user experience on XR data is improved.

With reference to the second aspect, in some implementations of the second aspect, the fourth identification information may be a quality of service flow identifier (QoS flow identifier, QFI) identifying a QoS flow. In this implementation, the second data unit can be received and identified, and QoS requirement information corresponding to the first data unit can be obtained based on the fourth identification information.

With reference to the second aspect, in some implementations of the second aspect, the second data unit includes protocol header information, and the third identification information is included in the protocol header information. Optionally, the protocol header information is general packet radio service (general packet radio service, GPRS) tunneling protocol (GPRS tunneling protocol, GTP) header information. Because content in the GTP header information may be parsed out, the third identification information may be obtained, and the access network is enabled to perform, based on the third identification information, integrity transmission on second data units including same third identification information. This meets a synchronization requirement between data or information.

With reference to the second aspect, in some implementations of the second aspect, the receiving a second data unit from a user plane network element, and obtaining third identification information and fourth identification information in the second data unit specifically includes: receiving at least two second data units from the user plane network element, where the at least two second data units each include same third identification information, and the at least two second data units each further include different fourth identification information. The obtaining, based on the fourth identification information, QoS profile information corresponding to the second data unit specifically includes: obtaining, based on the fourth identification information included in each of the at least two second data units, the QoS profile information corresponding to each of the at least two second data units. The outputting/sending the second data unit to a terminal based on the third identification information and the QoS profile information specifically includes: outputting/sending the at least two second data units based on the third identification information and the QoS profile information.

With reference to the second aspect, in some implementations of the second aspect, when the second data unit includes eighth identification information, an execution body of the method provided in the second aspect further obtains the eighth identification information in the second data unit. When the second data unit includes ninth identification information, the execution body of the method provided in the second aspect further obtains the ninth identification information in the second data unit. When the second data unit includes tenth identification information, the execution body of the method provided in the second aspect further obtains the tenth identification information in the second data unit. When obtaining one or more of the eighth identification information, the ninth identification information, or the tenth identification information from the second data unit, the execution body of the method provided in the second aspect outputs/sends the second data unit to the terminal based on one or more of the eighth identification information, the ninth identification information, or the tenth identification information.

In a possible implementation, the execution body of the method provided in the second aspect discards or sends a received data unit based on the eighth identification information. For example, the eighth identification information includes the PGN identification information, and the PGN identification information identifies a quantity of to-be-transmitted data packets that are transmitted as a whole (which is referred to as a quantity of to-be-transmitted data packets for short). The execution body of the method provided in the second aspect compares a quantity of received data packets that are transmitted as a whole (which is referred to as a quantity of received data packets for short) with the quantity of to-be-transmitted data packets. When the quantity of the received data packets is less than the quantity of the to-be-transmitted data packets, the execution body of the method provided in the second aspect discards the received data packets that are transmitted as a whole. When the quantity of the received data packets is equal to the quantity of the to-be-transmitted data packets, the execution body of the method provided in the second aspect sends, to the terminal, the received data packets that are transmitted as a whole. In this implementation, data transmission that does not contribute to XR data experience can be reduced. Therefore, a waste of transmission resources is reduced and transmission resource usage efficiency is improved.

In another possible implementation, the execution body of the method provided in the second aspect determines, based on the ninth identification information, a sequence of transmitting data units. For example, the ninth identification information includes one or more of the PGFID, the PGSID, or the PGTID. The execution body of the method provided in the second aspect determines, based on one or more of the PGFID, the PGSID, or the PGTID, a sequence of sending data packets to the terminal. In this implementation, data transmission scheduling can be optimized based on correlation of video frames, video slices, or video tiles, to improve user experience on XR data.

In another possible implementation, the execution body of the method provided in the second aspect determines a priority of transmitting data units based on the tenth identification information (which may also be understood as determining a preferentially transmitted data unit). For example, the tenth identification information includes the PGBS identification information. The execution body of the method provided in the second aspect determines, based on the PGBS identification information, a priority of sending data packets to the terminal, in other words, determines data packets to be preferentially sent to the terminal. In this implementation, a data transmission requirement with a high priority can be met. Therefore, user experience on XR data is improved.

According to a third aspect, an embodiment of this application provides a data transmission method. The method may be performed by a user plane network element or a fixed network device, or may be performed by a component (such as a processor, a chip, or a chip system) of a user plane network element or a fixed network device. The method includes: receiving a first data unit from a server or a data network, where the first data unit includes second identification information; performing protocol data encapsulation on the first data unit, to obtain a second data unit including third identification information, where the third identification information is related to the second identification information; and sending the second data unit to an access network device. Optionally, the first data unit is a data packet, and the data packet may be, for example, obtained after the server encodes and/or renders source data of XR. Optionally, the second data unit is a quality of service (quality of service, QoS) flow. Optionally, the first data unit may further include one or more of first identification information, fifth identification information, sixth identification information, or seventh identification information. Optionally, the second data unit may further include one or more of fourth identification information, eighth identification information, ninth identification information, or tenth identification information. For the first identification information, the second identification information, the third identification information, the fourth identification information, the fifth identification information, the sixth identification information, the seventh identification information, the eighth identification information, the ninth identification information, and the tenth identification information, refer to the descriptions in the first aspect. Details are not described herein again.

According to the method, integrity transmission can be performed on data or information that has a synchronization requirement or a dependency, to meet the synchronization requirement between the data or information. Therefore, user experience on an XR service is improved.

With reference to the third aspect, in some implementations of the third aspect, two or more first data units having same second identification information may correspond to data of a same picture frame. In this way, data information included in a plurality of first data units corresponding to a same picture frame may be subsequently transmitted as a whole on an access network device side. Therefore, user experience on a video picture is improved.

With reference to the third aspect, in some implementations of the third aspect, two or more first data units having same second identification information may correspond to a same piece of slice (slice) data or a same piece of tile (tile) data in a picture frame. In this way, the same piece of slice data or the same piece of tile data may be subsequently transmitted as a whole on an access network device side. Therefore, user experience on a video picture is improved.

With reference to the third aspect, in some implementations of the third aspect, two or more first data units having same second identification information may correspond to basic layer data and enhancement layer data of a same picture frame. In this way, data information included in a plurality of first data units corresponding to basic layer data and enhancement layer data of a same picture frame may be subsequently transmitted as a whole on an access network device side. Therefore, user experience on a video picture is improved.

With reference to the third aspect, in some implementations of the third aspect, two or more first data units having same second identification information may correspond to data of a picture frame and audio data synchronized with the picture frame. In this way, data information included in a plurality of first data units corresponding to data of a picture frame and audio data synchronized with the picture frame may be subsequently transmitted as a whole on an access network device side. Therefore, user experience on audio and video synchronization is improved.

With reference to the third aspect, in some implementations of the third aspect, two or more first data units having same second identification information may correspond to data of a same task, a same event, a same object, or a same type. For example, for a tactile internet, one or more of action information, tactile information, a picture frame, audio information, or the like may be used as data of a same task, a same event, a same object, or a same type. In this way, data information included in a plurality of first data units corresponding to data of a same task, a same event, a same object, or a same type may be subsequently transmitted as a whole on an access network device side. Therefore, user experience, for example, on a tactile internet service is improved.

With reference to the third aspect, in some implementations of the third aspect, second data units obtained by performing protocol data encapsulation on first data units having same second identification information have same third data identifiers.

For example, two or more first data units having same second identification information may correspond to data of a same picture frame. The second data units obtained by performing protocol data encapsulation on these first data units may include same third identification information. Data information included in these second data units including same third identification information is subsequently transmitted as a whole on the access network device side. Therefore, user experience on a video picture is improved.

For another example, two or more first data units having same second identification information may correspond to a same piece of slice (slice) data or a same piece of tile (tile) data in a picture frame. The second data units obtained by performing protocol data encapsulation on these first data units may include same third identification information. Data information included in these second data units including same third identification information is subsequently transmitted as a whole on the access network device side. Therefore, user experience on a video picture is improved.

For another example, two or more first data units having same second identification information may correspond to basic layer data and enhancement layer data of a same picture frame. The second data units obtained by performing protocol data encapsulation on these first data units may include same third identification information. Data information included in these second data units including same third identification information is subsequently transmitted as a whole on the access network device side. Therefore, user experience on a video picture is improved.

For another example, two or more first data units having same second identification information may correspond to data of a picture frame and audio data synchronized with the picture frame. The second data units obtained by performing protocol data encapsulation on these first data units may include same third identification information. Data information included in these second data units including same third identification information is subsequently transmitted as a whole on the access network device side. Therefore, user experience on audio and video synchronization is improved.

For another example, two or more first data units having same second identification information may correspond to data of a same task, a same event, a same object, or a same type. The second data units obtained by performing protocol data encapsulation on these first data units may include same third identification information. Data information included in these second data units including same third identification information is subsequently transmitted as a whole on the access network device side. Therefore, user experience, for example, on a tactile internet service is improved.

With reference to the third aspect, in some implementations of the third aspect, an execution body of the method provided in the third aspect may process the first data unit and/or send the second data unit based on one or more of the fifth identification information, the sixth identification information, or the seventh identification information included in the first data unit. For a specific implementation, refer to the descriptions in the first aspect. Details are not described herein again.

According to a fourth aspect, an embodiment of this application provides a data transmission method. The method may be performed by an access network device, or may be performed by a component (for example, a processor, a chip, or a chip system) of an access network device. The method includes: receiving a second data unit from a user plane network element, where the second data unit includes third identification information; and outputting/sending the second data unit to a terminal based on the third identification information in the second data unit. Optionally, the second data unit may further include one or more of fourth identification information, eighth identification information, ninth identification information, or tenth identification information. For the third identification information, the fourth identification information, the eighth identification information, the ninth identification information, and the tenth identification information, refer to the descriptions in the second aspect. Details are not described herein again. In this implementation, the access network device can implement, on an air interface, bound transmission of data that has a synchronization requirement or a dependency, to implement an effect of integrity transmission, improve network transmission efficiency, and improve user experience on an XR service.

With reference to the fourth aspect, in some implementations of the fourth aspect, integrity transmission is performed on second data units having same third identification information.

For example, the access network device transmits two or more second data units having same third identification information on a same radio bearer. In this manner, an access network can perform overall scheduling on the two or more second data units, to improve user experience on a video.

For another example, if two or more second data units have same third identification information, the access network device preferentially schedules these second data units. In this manner, an access network can set different priorities for different services, to improve user experience on multimedia services.

For another example, if two or more second data units have same third identification information, a part of the second data units are successfully transmitted, and a remaining part of the second data units fail to be transmitted, the access network device preferentially schedules a second data unit that fails to be transmitted. In this manner, it can be ensured, through scheduling, that a second data unit that fails to be transmitted can be preferentially transmitted reliably, to avoid a problem of invalid transmission of a second data unit that is successfully transmitted due to wrong transmission of a part of second data units.

With reference to the fourth aspect, in some implementations of the fourth aspect, the receiving a second data unit from a user plane network element specifically includes: receiving at least two second data units from the user plane network element, where the at least two second data units each include same third identification information. The outputting/sending the second data unit to a terminal based on the third identification information specifically includes: outputting/sending the at least two second data units to the terminal based on the third identification information included in each of the at least two second data units, for example, transmitting the at least two second data units on a same radio bearer.

With reference to the fourth aspect, in some implementations of the fourth aspect, when the second data unit includes the eighth identification information, an execution body of the method provided in the fourth aspect further obtains the eighth identification information in the second data unit. When the second data unit includes the ninth identification information, the execution body of the method provided in the fourth aspect further obtains the ninth identification information in the second data unit. When the second data unit includes the tenth identification information, the execution body of the method provided in the fourth aspect further obtains the tenth identification information in the second data unit.

With reference to the fourth aspect, in some implementations of the fourth aspect, when obtaining one or more of the eighth identification information, the ninth identification information, or the tenth identification information from the second data unit, the execution body of the method provided in the fourth aspect outputs/sends the second data unit to the terminal based on one or more of the eighth identification information, the ninth identification information, or the tenth identification information. For a specific implementation, refer to the descriptions in the second aspect. Details are not described herein again.

According to a fifth aspect, an embodiment of this application provides an apparatus, to implement the method according to any one of the first aspect, the third aspect, the possible implementations of the first aspect, or the possible implementations of the third aspect. The apparatus includes a corresponding unit or component configured to perform the foregoing method. The unit included in the apparatus may be implemented by software and/or hardware. The apparatus may be, for example, a terminal or a network device, or may be a chip, a chip system, or a processor that supports a terminal or a network device in implementing the foregoing method.

According to a sixth aspect, an embodiment of this application provides an apparatus, to implement the method according to any one of the second aspect, the fourth aspect, the possible implementations of the second aspect, or the possible implementations of the fourth aspect. The apparatus includes a corresponding unit or component configured to perform the foregoing method. The unit included in the apparatus may be implemented by software and/or hardware. The apparatus may be, for example, a terminal or a network device, or may be a chip, a chip system, or a processor that supports a terminal or a network device in implementing the foregoing method.

According to a seventh aspect, an embodiment of this application provides an apparatus, including a processor, where the processor is coupled to a memory, and the memory is configured to store a program or instructions; and when the program or the instructions is/are executed by the processor, the apparatus is enabled to implement the method according to any one of the first aspect, the third aspect, the possible implementations of the first aspect, or the possible implementations of the third aspect.

According to an eighth aspect, an embodiment of this application provides an apparatus, including a processor, where the processor is coupled to a memory, and the memory is configured to store a program or instructions; and when the program or the instructions is/are executed by the processor, the apparatus is enabled to implement the method according to any one of the second aspect, the fourth aspect, the possible implementations of the second aspect, or the possible implementations of the fourth aspect.

According to a ninth aspect, an embodiment of this application provides a computer-readable storage medium. The computer-readable storage medium stores a computer program or instructions. When the computer program or the instructions is/are executed, a computer is enabled to perform the method according to any one of the first aspect, the third aspect, the possible implementations of the first aspect, or the possible implementations of the third aspect.

According to a tenth aspect, an embodiment of this application provides a computer-readable storage medium. The computer-readable storage medium stores a computer program or instructions. When the computer program or the instructions is/are executed, a computer is enabled to perform the method according to any one of the second aspect, the fourth aspect, the possible implementations of the second aspect, or the possible implementations of the fourth aspect.

According to an eleventh aspect, an embodiment of this application provides a computer program product including computer program code. When the computer program code is run on a computer, the computer is enabled to perform the method according to any one of the first aspect, the third aspect, the possible implementations of the first aspect, or the possible implementations of the third aspect.

According to a twelfth aspect, an embodiment of this application provides a computer program product including computer program code. When the computer program code is run on a computer, the computer is enabled to perform the method according to any one of the second aspect, the fourth aspect, the possible implementations of the second aspect, or the possible implementations of the fourth aspect.

According to a thirteenth aspect, an embodiment of this application provides a chip, including a processor, where the processor is coupled to a memory, and the memory is configured to store a program or instructions; and when the program or the instructions is/are executed by the processor, the chip is enabled to implement the method according to any one of the first aspect, the third aspect, the possible implementations of the first aspect, or the possible implementations of the third aspect.

According to a fourteenth aspect, an embodiment of this application provides a chip, including a processor, where the processor is coupled to a memory, and the memory is configured to store a program or instructions; and when the program or the instructions is/are executed by the processor, the chip is enabled to implement the method according to any one of the second aspect, the fourth aspect, the possible implementations of the second aspect, or the possible implementations of the fourth aspect.

According to a fifteenth aspect, an embodiment of this application provides a communication system including the apparatus according to the fifth aspect and the apparatus according to the sixth aspect.

According to a sixteenth aspect, an embodiment of this application provides a communication system including the apparatus according to the seventh aspect and the apparatus according to the eighth aspect.

DESCRIPTION OF EMBODIMENTS

Figure 1:
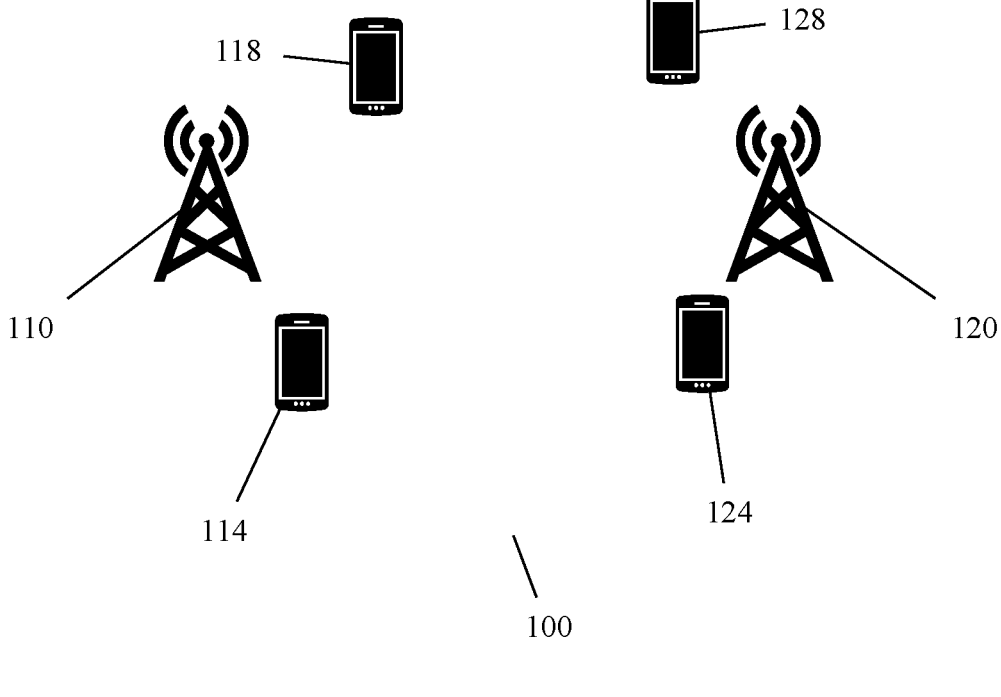
FIG. 1 is a schematic diagram of a communication system to which an embodiment of this application is applied.

A method and an apparatus provided in embodiments of this application may be applied to a communication system. FIG. 1 is a schematic diagram of a structure of a communication system. The communication system 100 includes one or more access network devices (an access network device 110 and an access network device 120 are shown in the figure), and one or more terminals that communicate with the one or more access network devices. As shown in FIG. 1, a terminal 114 and a terminal 118 communicate with the access network device 110, and a terminal 124 and a terminal 128 communicate with the access network device 120. It may be understood that the access network device and the terminal may also be referred to as communication devices.

The method and the apparatus provided in embodiments of this application may be applied to various communication systems, for example, a 4th generation (4th generation, 4G) communication system, a 4.5G communication system, a 5G communication system, a system in which a plurality of communication systems are integrated, or a future evolved communication system (for example, a 5.5G communication system or a 6G communication system). The communication systems include, for example, a long term evolution (long term evolution, LTE) system, a new radio (new radio, NR) system, a wireless fidelity (wireless fidelity, Wi-Fi) system, a communication system related to the 3rd generation partnership project (3rd generation partnership project, 3GPP), and another communication system of this type.

Figure 2:
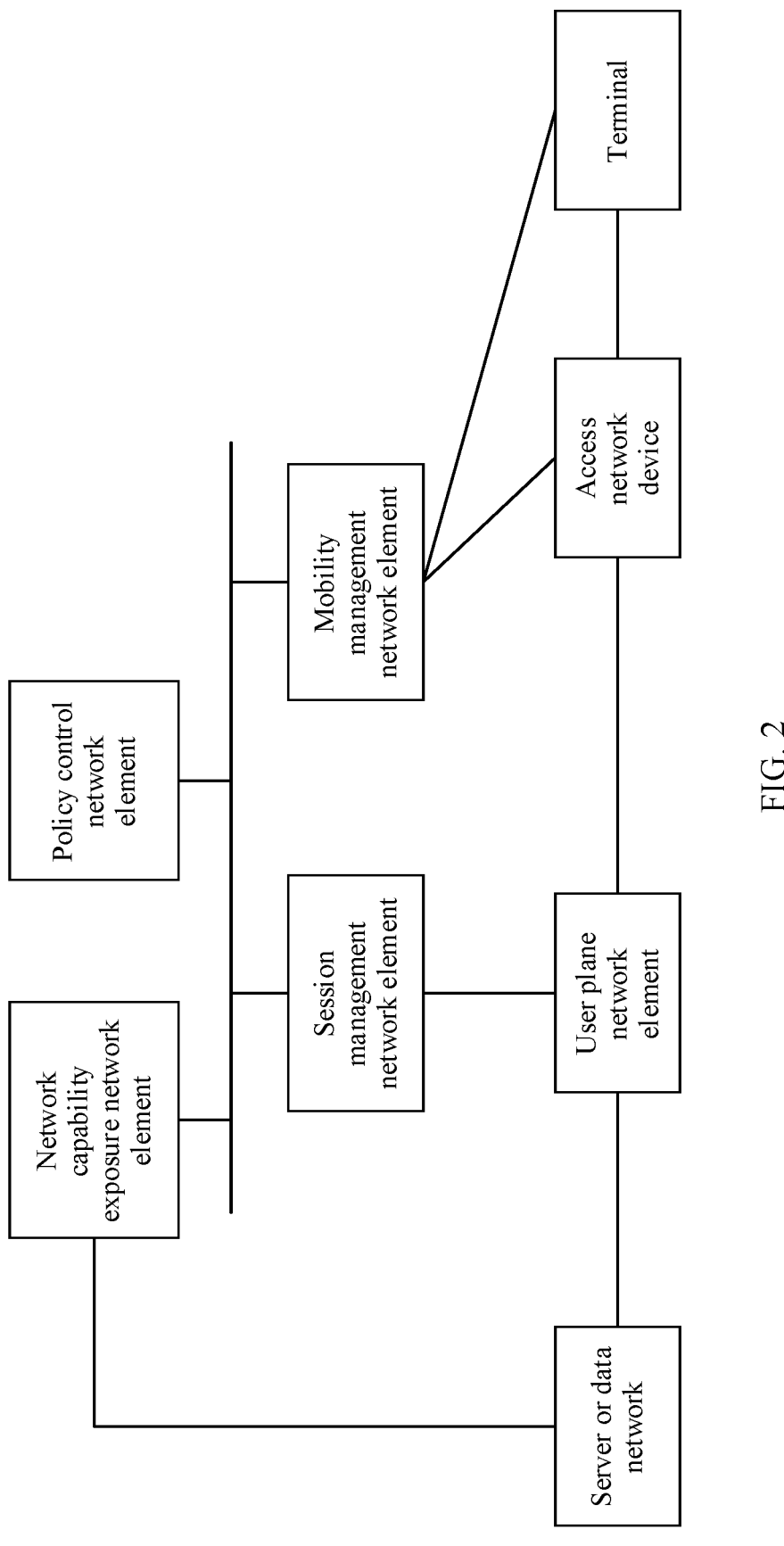
FIG. 2 is a schematic diagram of an architecture of a communication system to which an embodiment of this application is applied.

The method and the apparatus provided in embodiments of this application may be applied to architectures of a plurality of communication systems. FIG. 2 is a schematic diagram of an architecture of a communication system. In the architecture of the communication system, a terminal accesses a core network via an access network (radio access network, RAN) device. The terminal may establish a connection to a data network (data network, DN) or a server in a data network over an access network and a core network. The data network may include, for example, an operator service, an Internet (Internet), or a third-party service. In a 4G communication system, the connection may be a packet data network connection (packet data network connection, PDN connection) or a bearer. In a 5G communication system, the connection may be a protocol data unit session (protocol data unit session, PDU Session). In a future communication system such as a 6th generation (6th generation, 6G) communication system, the connection may be a PDU session, a PDN connection, or another similar concept. This is not limited in embodiments of this application. In embodiments of this application, the connection established between the terminal and the data network or the server may also be referred to as a session.

The access network device in this application may be any device having a wireless transceiver function. The access network device includes but is not limited to: an evolved NodeB (NodeB or eNB or e-NodeB, evolved NodeB) in LTE, a gNodeB (gNodeB or gNB) or a transmission reception point (transmission receiving point/transmission reception point, TRP) in NR, a base station that subsequently evolves in 3GPP, an access node in a Wi-Fi system, a wireless relay node, a wireless backhaul node, a core network device, or the like. A base station may be a macro base station, a micro base station, a picocell base station, a small cell, a relay station, a balloon station, or the like. A plurality of base stations may support the foregoing networks using a same technology, or may support the foregoing networks using different technologies. The base station may include one or more co-site or non-co-site TRPs. Alternatively, the access network device may be a server (for example, a cloud server), a radio controller in a cloud radio access network (cloud radio access network, CRAN) scenario, a central unit (central unit, CU), and/or a distributed unit (distributed unit, DU). The access network device may alternatively be a server, a wearable device, a machine communication device, a vehicle-mounted device, a smart screen, or the like. The following provides descriptions by using an example in which the access network device is a base station. The plurality of access network devices may be base stations in a same type, or may be base stations in different types. The base station may communicate with a terminal device, or may communicate with a terminal device via a relay station. The terminal device may communicate with a plurality of base stations using different technologies. For example, the terminal device may communicate with a base station supporting an LTE network, or may communicate with a base station supporting a 5G network, or may support dual connections to a base station supporting an LTE network and a base station supporting a 5G network.

The terminal device in this application is a device having a wireless transceiver function, and may be deployed on land, including an indoor or outdoor device, a handheld device, or a vehicle-mounted device, may be deployed on the water (for example, on a ship), or may be deployed in the air (for example, on an airplane, a balloon, or a satellite). The terminal may be a mobile phone (mobile phone), a tablet computer (Pad), a computer having a wireless transceiver function, a virtual reality (virtual reality, VR) terminal device, an augmented reality (augmented reality, AR) terminal device, a terminal in industrial control (industrial control), a vehicle-mounted terminal device, a terminal in self-driving (self-driving), a terminal in assisted driving, a terminal in telemedicine (remote medical), a terminal in a smart grid (smart grid), a terminal in transportation safety (transportation safety), a terminal in a smart city (smart city), a terminal in a smart home (smart home), or the like. An application scenario is not limited in embodiments of this application. The terminal may also be referred to as a terminal device, user equipment (user equipment, UE), an access terminal device, a vehicle-mounted terminal, an industrial control terminal, a UE unit, a UE station, a mobile station, a remote station, a remote terminal device, a mobile device, a UE terminal device, a wireless communication device, a machine terminal, a UE proxy, a UE apparatus, or the like. The terminal may be fixed or movable.

By way of example and not limitation, the terminal in this application may be a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, or smart jewelry for monitoring physical signs.

In this application, the terminal may be a terminal in an internet of things (internet of things, IoT) system. IoT is an important component in development of future information technologies. A main technical feature of the IoT is to connect an object to a network by using a communication technology, to implement an intelligent network of human-machine interconnection and thing-thing interconnection. The terminal in this application may be a terminal in machine type communication (machine type communication, MTC). The terminal in this application may be a vehicle-mounted module, a vehicle-mounted module, an onboard component, an automotive chip, or an on board unit that is built in a vehicle as one or more components or units. The vehicle may implement a method in this application by using the vehicle-mounted module, the onboard component, the automotive chip, or the on board unit that is built in the vehicle. Therefore, embodiments of this application may be applied to an internet of vehicles, for example, vehicle to everything (vehicle to everything, V2X), long term evolution-vehicle (long term evolution-vehicle, LTE-V), and vehicle to vehicle (vehicle to vehicle, V2V).

Alternatively, the terminal in this application may be a VR terminal, an AR terminal, or an MR terminal. The VR terminal, the AR terminal, and the MR terminal each may be referred to as an XR terminal. For example, the XR terminal may be a head-mounted device (for example, a helmet or glasses), or may be an all-in-one device, or may be a television, a display, a car, a vehicle-mounted device, a tablet, a smart screen, a holographic projector, a video player, a remote management robot, or a tactile internet terminal. The XR terminal can present XR data to a user, and the user can experience diversified XR services by wearing or using the XR terminal. The XR terminal may access a network in a wireless or wired manner, for example, by using a Wi-Fi or 5G system.

A core network includes a mobility management network element, a session management network element, and a user plane network element. Optionally, the core network further includes a network capability exposure network element and/or a policy control network element.

The mobility management network element is mainly used for mobility management in a mobile network, for example, user location update, registration of a user with a network, and user switching. In a 4G communication system, the mobility management network element may be a mobility management entity (mobility management entity, MME). In a 5G communication system, the mobility management network element may be an access and mobility management function (access and mobility management function, AMF).

The session management network element is mainly used for session management in a mobile network, for example, session establishment, modification, and release. A specific function is, for example, allocating an internet protocol (internet protocol, IP) address to a user, or selecting a user plane network element that provides a packet forwarding function. In the 4G communication system, the session management network element may be a serving gateway control plane (serving gateway control plane, SGW-C), a packet data network gateway control plane (packet data network gateway control plane, PGW-C), or a network element in which an SGW-C and a PGW-C are co-deployed. In the 5G communication system, the session management network element may be a session management function (session management function, SMF).

The user plane network element is mainly configured to forward user data packet according to a routing rule of the session management network element. In the 4G communication system, the user plane network element may be a serving gateway user plane (serving gateway user plane, SGW-U), a packet data network gateway user plane (packet data network gateway user plane, PGW-U), or a network element in which an SGW-U and a PGW-U are co-deployed. In the 5G communication system, the user plane network element may be a user plane function (user plane function, UPF) network element.

The policy control network element includes a user subscription data management function, a policy control function, a charging policy control function, quality of service (quality of service, QoS) control, and the like. In the 4G communication system, the policy control network element may be a policy control and charging rules function (policy control and charging function, PCRF). In the 5G communication system, the policy control network element may be a policy control function (policy control function, PCF).

The network capability exposure network element is mainly configured to expose a capability of a communication system to a third-party, an application service function, and the like, and transfer information between the third-party, the application server, and the communication system. In the 4G communication system, the network capability exposure network element may be a service capability exposure function (service capability exposure function, SCEF). In the 5G communications system, the network capability exposure network element may be a network exposure function (network exposure function, NEF).

In a future communication system such as a 6G communication system, the network elements or devices may still use names of the network elements or devices in the 4G or 5G communication system, or may have another name. Functions of the network elements or devices may be implemented by one independent network element, or may be jointly implemented by several network elements. This is not limited in embodiments of this application.

During actual deployment, network elements in a core network may be deployed on a same physical device or different physical devices. For example, in a possible deployment, an AMF and an SMF may be deployed on a same physical device. For another example, a network element of a 5G core network and a network element of a 4G core network may be deployed on a same physical device.

During actual deployment, network elements in the core network may be co-deployed. For example, the mobility management network element and the session management network element may be co-deployed. For another example, the session management network element may be integrated with the user plane network element. When two or more network elements are co-deployed, interaction between the two or more network elements provided in this application becomes an internal operation of the co-deployed network element, or may be omitted.

Compared with a core network in the 4G communication system, a core network in the 5G communication system uses an architecture in which a control plane is separated from a user plane and a service-based architecture. It may be understood that the solutions in this application are not only applicable to the 5G communication system, but also applicable to an evolved 4G communication system, a future 6G communication system, or the like. A network to which the solutions of this application are applicable may use the architecture in which the control plane is separated from the user plane, or may use an architecture in which a control plane and a user plane are integrated. A network to which the solutions of this application are applicable may use a service-based architecture, or may use a non-service-based architecture.

It may be understood that, with evolution of a network, names of the network elements may change, and functions of the network elements may also be combined, separated, or even changed. However, these changes do not mean that they depart from the application scope of the solutions of this application.

In a wireless communication network, an XR technology has advantages such as multi-view and strong interaction, can provide brand-new experience for a user, and has a great application value and business potential. XR includes technologies such as VR, AR, and MR, and can be widely used in many fields such as entertainment, gaming, healthcare, advertising, industry, online education, and engineering. The VR technology is mainly to render visual and audio scenarios to simulate sensory stimulation of vision and audio in the real world to users as much as possible. The VR technology usually requires users to wear XR terminals (for example, head-mounted devices) to simulate vision and/or hearing of the users. The VR technology may further perform action tracking on the users, to update simulated visual and/or auditory content in a timely manner. The AR technology is mainly to provide additional visual and/or auditory information or manually generated content in a real environment perceived by users. The users may directly (where for example, sensing, processing, and rendering is not performed) or indirectly (where for example, transfer is performed by using a sensor or the like) perceive the real environment, and further enhancement processing is performed. The MR technology is to insert some virtual elements into physical scenarios, to provide users with immersive experience by adding these elements as a part of a real scenario. A network device may process and transmit data (which may be referred to as XR data) generated by the XR service. For example, a network device in cloud may render and encode (for example, source encode) XR source data, and transmit XR data to an XR terminal via a network device in a core network and/or an access network. The XR terminal provides diversified XR experience (for example, immersive experience, visual experience, interaction experience, or device experience) for users by processing the XR data. The XR experience may be evaluated from a plurality of different dimensions, for example, including one or more of the following dimensions: image definition, image smoothness, image distortion, image stereoscopy, image black borders, image smearing, sound quality, sound effect, angle of view, freezing, artifacts, dizziness, audio and video synchronization, interaction freedom, interaction operation response speed, interaction operation precision, interaction content loading speed, terminal wearing comfort, terminal wearing fatigue, terminal battery life, terminal portability, terminal visual impairment friendliness, or the like.

A feature of XR data is that there is a specific dependency between data. For example, a video picture frame in XR data may be generally divided into a plurality of data packets. If a data packet in the plurality of data packets fails to be transmitted, it is possible that the entire video picture frame cannot be correctly received. For another example, in a tactile internet, information such as video information, tactile information, and control information has dependent synchronization requirements. When transmission of a type of information is lost or delayed, an overall service effect and user experience are affected. Therefore, when XR data having a dependency is transmitted, how to meet a synchronization requirement between data to improve user experience on an XR service becomes an urgent problem to be resolved.

Embodiments of this application provide an integrity transmission method for transmitting XR data. In the method, integrity transmission is performed on data or information that has a synchronization requirement or a dependency, to meet the synchronization requirement between the data or information. Therefore, user experience on an XR service is improved.

In this application, data integrity transmission may be understood as that two or more data units are transmitted as a whole. There may be a plurality of different understandings of an object for which integrity is implemented.

For example, the object for which integrity is implemented may be content (content), in other words, the integrity is content integrity. Content in a plurality of different dimensions has an association relationship, and therefore, integrity transmission is performed on a plurality of data units corresponding to the content in the plurality of dimensions. For example, a plurality of data units corresponding to content of a picture frame have an association relationship, a basic layer data unit and an enhancement layer data unit corresponding to content of a picture frame have an association relationship, and a picture frame data unit and an audio data unit have an association relationship.

For another example, the object for which integrity is implemented may alternatively be a task, an event, an object, or a type, in other words, the integrity is task integrity, event integrity, object integrity, or type integrity. A plurality of data units in a same task, a same event, a same object, or a same type have an association relationship. Therefore, integrity transmission is performed on the plurality of data units in the same task, the same event, the same object, or the same type. For example, in a tactile internet, a plurality of data units corresponding to information such as a video, audio, an action, and a tactile sense have an association relationship.

It may be understood that integrity transmission and an integrity object in this application may alternatively have other descriptions. For example, integrity transmission may alternatively be described as task-driven transmission, event-based transmission, object-oriented transmission, or the like, and all of them fall within the scope of this application.

Embodiments provided in this application are applicable to a plurality of different scenarios. For example, FIG. 3 to FIG. 5 are schematic diagrams of several scenarios to which embodiments of this application are applicable.

Figures 3, 4, 5:
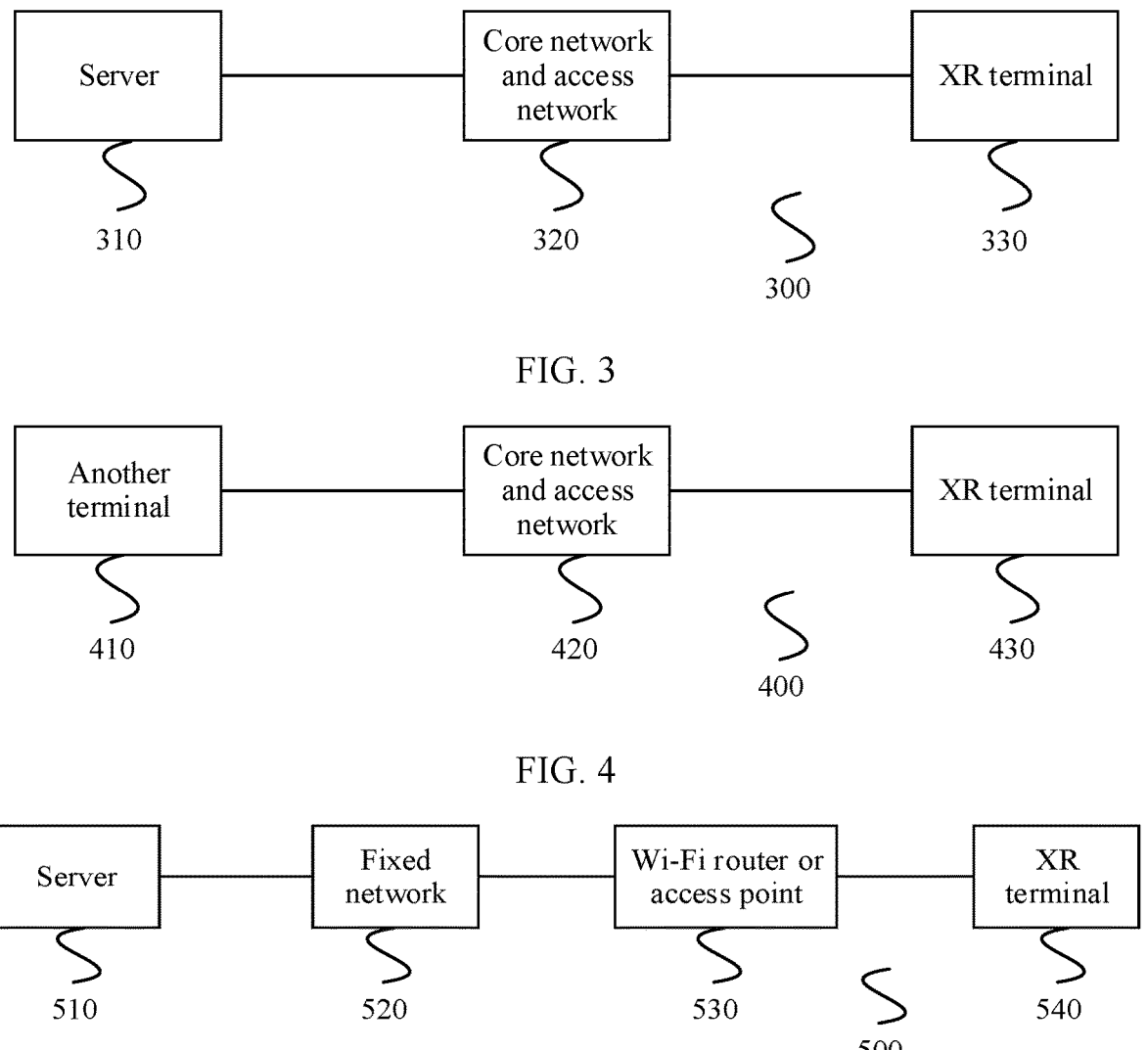
FIG. 3 to FIG. 5 are schematic diagrams of several scenarios to which embodiments of this application are applicable.

FIG. 3 is a schematic diagram of a scenario to which an embodiment of this application is applicable. FIG. 3 shows a system 300, including a server 310, a core network and an access network 320 (which may be referred to as a transmission network 320 for short, for example, an LTE, a 5G, or a 6G network), and an XR terminal 330. The server 310 may be configured to encode, decode, and render source data of XR, the transmission network 320 may be configured to transmit XR data, and the XR terminal 330 provides a user with diversified XR experience by processing the XR data. It may be understood that another apparatus may be further included between the transmission network 320 and the XR terminal 330. For example, another terminal (for example, a mobile phone, a notebook computer, or a car) and/or a network device (for example, a relay, a Wi-Fi router, or a Wi-Fi access point) may be further included. The XR terminal 330 obtains the XR data from the transmission network 320 via another terminal and/or network device.

FIG. 4 is a schematic diagram of another scenario to which an embodiment of this application is applicable. FIG. 4 shows a system 400, including an XR terminal 430, a core network and an access network 420 (which may be referred to as a transmission network 420 for short, for example, an LTE, a 5G, or a 6G network), and another terminal 410. The another terminal 410 is a terminal other than the XR terminal 430. The another terminal 410 may be an XR terminal, or may be a common terminal (which may also be referred to as a non-XR terminal). The another terminal 410 may transmit data to the XR terminal 430 over the transmission network 420. For example, in a tactile internet, the XR terminal 430 may be a remote management robot or a remote operator in a controlled domain, and the another terminal 410 may be a tactile user and/or a manual system interface in a primary domain. The another terminal 410 in the primary domain transmits data to the XR terminal 430 in the controlled domain via the transmission network 420, to implement remote management of the XR terminal 430.

FIG. 5 is a schematic diagram of another scenario to which an embodiment of this application is applicable. FIG. 5 shows a system 500, including a server 510, a fixed network 520, a Wi-Fi router or a Wi-Fi access point 530 (which may be referred to as a Wi-Fi apparatus 530 for short), and an XR terminal 540. The server 510 may be configured to encode, decode, and render source data of XR, and transmit XR data to the XR terminal 540 over the fixed network 520 and the Wi-Fi apparatus 530.

The following describes the technical solutions of this application in detail by using specific embodiments with reference to the accompanying drawings. The following embodiments and implementations may be combined with each other, and same or similar concepts or processes may not be described again in some embodiments. It should be understood that a function explained in this application may be implemented by using an independent hardware circuit, software running in combination with a processor/microprocessor or a general-purpose computer, an application-specific integrated circuit, and/or one or more digital signal processors. When described as a method, this application may alternatively be implemented in a computer processor and a memory coupled to the processor.

Figure 6:
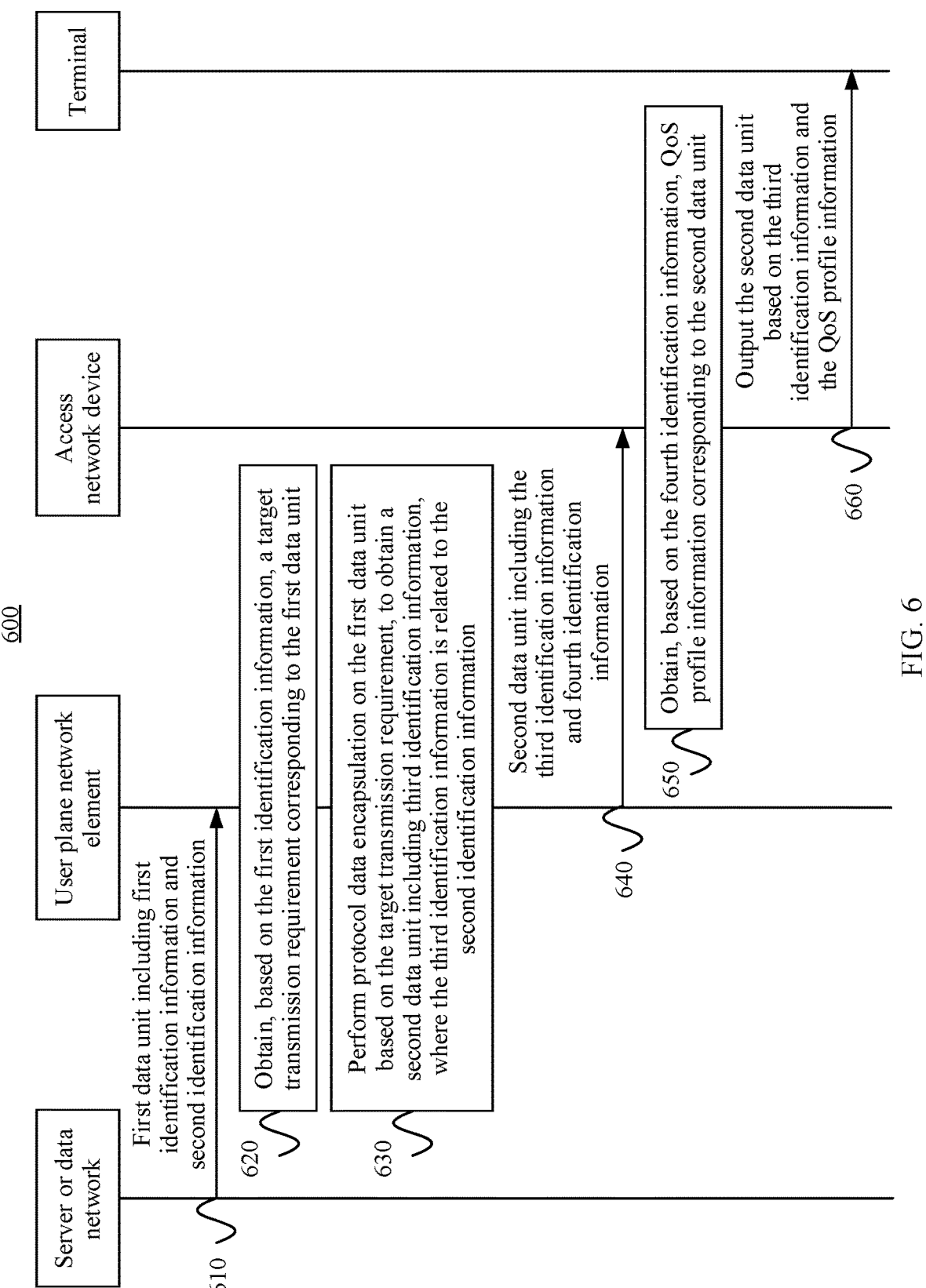
FIG. 6 is a schematic interaction diagram of a communication method according to this application.

FIG. 6 is a schematic interaction diagram of a communication method 600 according to an embodiment of this application. In FIG. 6, an example in which a server or a data network, a user plane network element, an access network device, and a terminal are used as execution bodies of the interaction diagram is used to illustrate the communication method. However, an execution body of the interaction diagram is not limited in this application. For example, the server in FIG. 6 may alternatively be a chip, a chip system, or a processor that supports the server in implementing the method, the user plane network element in FIG. 6 may alternatively be a chip, a chip system, or a processor that supports the user plane network element in implementing the method, the access network device in FIG. 6 may alternatively be a chip, a chip system, or a processor that supports the access network device in implementing the method, and the terminal in FIG. 6 may alternatively be a chip, a chip system, or a processor that supports the terminal in implementing the method. The method 600 shown in FIG. 6 includes a part 610 to a part 660. According to the method, integrity transmission can be performed on data or information that has a synchronization requirement or a dependency, to meet the synchronization requirement between the data or information. Therefore, user experience on an XR service is improved. The following describes the method 600 provided in this embodiment of this application.

Part 610: The server or the data network sends, to the user plane network element, a first data unit including first identification information and second identification information. Correspondingly, the user plane network element receives the first data unit. Optionally, the first data unit is a data packet, and the data packet may be, for example, obtained after the server encodes and/or renders source data of XR.

Optionally, the first identification information identifies the first data unit. For example, the first identification information includes packet flow description (packet flow description, PFD) information of the first data unit or other index information or identifier (identifier, ID) information that can identify the first data unit.

Optionally, the second identification information includes integrity index information. Data information included in first data units having same integrity index information may be subsequently transmitted as a whole on an access network device side. It may be understood that a specific name of the integrity index information is not limited in this embodiment of this application, the integrity index information is merely a possible name, and any other information that can implement the foregoing functions should be understood as the integrity index information in the solutions of this application.

In a possible implementation, two or more first data units having same second identification information may correspond to data of a same picture frame. In this way, data information included in a plurality of first data units corresponding to a same picture frame may be subsequently transmitted as a whole on the access network device side. Therefore, user experience on a video picture is improved.

In another possible implementation, two or more first data units having same second identification information may correspond to a same piece of slice (slice) data or a same piece of tile (tile) data in a picture frame. In this way, the same piece of slice data or the same piece of tile data may be subsequently transmitted as a whole on the access network device side. Therefore, user experience on a video picture is improved.

In another possible implementation, two or more first data units having same second identification information may correspond to basic layer data and enhancement layer data of a same picture frame. In this way, data information included in a plurality of first data units corresponding to basic layer data and enhancement layer data of a same picture frame may be subsequently transmitted as a whole on the access network device side. Therefore, user experience on a video picture is improved.

In another possible implementation, two or more first data units having same second identification information may correspond to data of a picture frame and audio data synchronized with the picture frame. In this way, data information included in a plurality of first data units corresponding to data of a picture frame and audio data synchronized with the picture frame may be subsequently transmitted as a whole on the access network device side. Therefore, user experience on audio and video synchronization is improved.

In another possible implementation, two or more first data units having same second identification information may correspond to data of a same task, a same event, a same object, or a same type. For example, for a tactile internet, one or more of action information, tactile information, a picture frame, audio information, or the like may be used as data of a same task, a same event, a same object, or a same type. In this way, data information included in a plurality of first data units corresponding to data of a same task, a same event, a same object, or a same type may be subsequently transmitted as a whole on the access network device side. Therefore, user experience, for example, on a tactile internet service is improved.

Optionally, the first data unit further includes fifth identification information, and the fifth identification information identifies a quantity of data units that are transmitted as a whole.

The data units that are transmitted as a whole may include the first data unit. For example, the fifth identification information may include integrity quantity identification information, where the integrity quantity identification information identifies a quantity of data units that are transmitted as a whole. It may be understood that a specific name of the integrity quantity identification information is not limited in this embodiment of this application, the integrity quantity identification information is merely a possible name, and any other information that can implement the foregoing functions should be understood as the integrity quantity identification information in the solutions of this application.

Optionally, the first data unit further includes sixth identification information, and the sixth identification information identifies a frame, a slice, or a tile to which data units that are transmitted as a whole belong. The data units that are transmitted as a whole may include the first data unit. For example, the sixth identification information may include one or more of integrity frame identification information, integrity slice identification information, or integrity tile identification information. The integrity frame identification information identifies a frame to which data units that are transmitted as a whole belong, the integrity slice identification information identifies a slice to which data units that are transmitted as a whole belong, and the integrity tile identification information identifies a tile to which data units that are transmitted as a whole belong. It may be understood that a specific name of the integrity frame identification information, the integrity slice identification information, or the integrity tile identification information is not limited in this embodiment of this application. The integrity frame identification information, the integrity slice identification information, or the integrity tile identification information is merely a possible name. Any other information that can implement the foregoing functions should be understood as the integrity frame identification information, the integrity slice identification information, or the integrity tile identification information in the solutions of this application.

Optionally, the first data unit further includes seventh identification information, and the seventh identification information identifies a total size of data units that are transmitted as a whole. The data units that are transmitted as a whole may include the first data unit. For example, the seventh identification information may include integrity size identification information, where the integrity size identification information identifies a total size of data units that are transmitted as a whole. It may be understood that a specific name of the integrity size identification information is not limited in this embodiment of this application, the integrity size identification information is merely a possible name, and any other information that can implement the foregoing functions should be understood as the integrity size identification information in the solutions of this application.

Part 620: The user plane network element obtains, based on the first identification information, a target transmission requirement corresponding to the first data unit. Optionally, the target transmission requirement includes an integrity transmission requirement. Data information included in first data units having the integrity transmission requirement is subsequently transmitted as a whole on the access network device side. It may be understood that a specific name of the integrity transmission requirement is not limited in embodiments of this application, the integrity transmission requirement is merely a possible name, and any other requirement name that can reflect the foregoing functions should be understood as the integrity transmission requirement in the solutions of this application.

In a possible implementation, two or more first data units having same second identification information may correspond to data of a same picture frame. When these first data units have the target transmission requirement, data information included in these first data units is subsequently transmitted as a whole on the access network device side. Therefore, user experience on a video picture is improved.

In another possible implementation, two or more first data units having same second identification information may correspond to a same piece of slice (slice) data or a same piece of tile (tile) data in a picture frame. When these first data units have the target transmission requirement, data information included in these first data units is subsequently transmitted as a whole on the access network device side. Therefore, user experience on a video picture is improved.

In another possible implementation, two or more first data units having same second identification information may correspond to basic layer data and enhancement layer data of a same picture frame. When these first data units have the target transmission requirement, data information included in these first data units is subsequently transmitted as a whole on the access network device side. Therefore, user experience on a video picture is improved.

In another possible implementation, two or more first data units having same second identification information may correspond to data of a picture frame and audio data synchronized with the picture frame. When these first data units have the target transmission requirement, data information included in these first data units is subsequently transmitted as a whole on the access network device side. Therefore, user experience on audio and video synchronization is improved.

In another possible implementation, two or more first data units having same second identification information may correspond to data of a same task, a same event, a same object, or a same type. For example, for a tactile internet, one or more of action information, tactile information, a picture frame, audio information, or the like may be used as data of a same task, a same event, a same object, or a same type. When these first data units have the target transmission requirement, data information included in these first data units is subsequently transmitted as a whole on the access network device side. Therefore, user experience, for example, on a tactile internet service is improved.

Optionally, there is a first correspondence between the target transmission requirement and the first identification information. That the user plane network element obtains, based on the first identification information, a target transmission requirement corresponding to the first data unit may specifically include: The user plane network element obtains the target transmission requirement based on the first identification information and the first correspondence. In this manner, the target transmission requirement can be obtained more conveniently.

The first correspondence may be predefined, or may be obtained by the user plane network element from a session management network element. When the user plane network element obtains the first correspondence from the session management network element, optionally, the first correspondence is included in a data packet detection rule (packet detection rule, PDR), and the session management network element configures, for the user plane network element, the PDR including the first correspondence. The session management network element may obtain the first correspondence from the server via a network capability exposure network element and/or a policy control network element.

Part 630: The user plane network element performs protocol data encapsulation on the first data unit based on the target transmission requirement, to obtain a second data unit including third identification information, where the third identification information is related to the second identification information. Optionally, the second data unit is a QoS flow.

The second data unit may further include fourth identification information, and the fourth identification information identifies the second data unit. For example, when the second data unit is a QoS flow, the fourth identification information may be a quality of service flow identifier (QoS flow identifier, QFI) identifying the QoS flow.

Optionally, the third identification information includes a data packet group identifier (packet group ID, PGID). Data information included in second data units that include the data packet group ID is subsequently transmitted as a whole on the access network device side. It may be understood that a specific name of the data packet group ID is not limited in this embodiment of this application, the data packet group ID is merely a possible name, and any other name that can reflect the foregoing functions should be understood as the data packet group ID in the solutions of this application.

The third identification information in the second data unit is related to the second identification information in the first data unit. It may be understood as that the third identification information is set based on the second identification information. In a possible implementation, second data units obtained by performing protocol data encapsulation on first data units having same second identification information have same third data identifiers.

For example, two or more first data units having same second identification information may correspond to data of a same picture frame. When these first data units have the target transmission requirement, second data units obtained by performing protocol data encapsulation on these first data units may include same third identification information. Data information included in these second data units including same third identification information is subsequently transmitted as a whole on the access network device side. Therefore, user experience on a video picture is improved.

For another example, two or more first data units having same second identification information may correspond to a same piece of slice (slice) data or a same piece of tile (tile) data in a picture frame. When these first data units have the target transmission requirement, second data units obtained by performing protocol data encapsulation on these first data units may include same third identification information. Data information included in these second data units including same third identification information is subsequently transmitted as a whole on the access network device side. Therefore, user experience on a video picture is improved.

For another example, two or more first data units having same second identification information may correspond to basic layer data and enhancement layer data of a same picture frame. When these first data units have the target transmission requirement, second data units obtained by performing protocol data encapsulation on these first data units may include same third identification information. Data information included in these second data units including same third identification information is subsequently transmitted as a whole on the access network device side. Therefore, user experience on a video picture is improved.

For another example, two or more first data units having same second identification information may correspond to data of a picture frame and audio data synchronized with the picture frame. When these first data units have the target transmission requirement, second data units obtained by performing protocol data encapsulation on these first data units may include same third identification information. Data information included in these second data units including same third identification information is subsequently transmitted as a whole on the access network device side. Therefore, user experience on audio and video synchronization is improved.

For another example, two or more first data units having same second identification information may correspond to data of a same task, a same event, a same object, or a same type. When these first data units have the target transmission requirement, second data units obtained by performing protocol data encapsulation on these first data units may include same third identification information. Data information included in these second data units including same third identification information is subsequently transmitted as a whole on the access network device side. Therefore, user experience, for example, on a tactile internet service is improved.

Optionally, the second data unit includes protocol header information, and the third identification information is included in the protocol header information. In part 630, when protocol data encapsulation is performed on the first data unit to obtain the second data unit, the protocol header information may be added, and the third identification information is included in the protocol header information.

In a possible implementation, the protocol header information is general packet radio service (general packet radio service, GPRS) tunneling protocol (GPRS tunneling protocol, GTP) header information. When protocol data encapsulation is performed on the first data unit according to GTP, the third identification information may be included in the GTP header information. For example, the third identification information may be included in an extended header part in the GTP header information. Because the access network device may parse out content in the GTP header information, the access network device may obtain the third identification information. Therefore, the access network device is enabled to perform, based on the third identification information, integrity transmission on second data units including same third identification information. This meets a synchronization requirement between data or information.

It may be understood that a specific protocol based on which protocol data encapsulation is performed is not limited in this embodiment of this application, GTP is merely a possible data encapsulation protocol, and any other protocol that can implement the foregoing functions should be understood as the protocol based on which protocol data encapsulation is performed in the solutions of this application.

Optionally, when the first data unit includes fifth identification information, the second data unit obtained by the user plane network element by performing protocol data encapsulation on the first data unit further includes eighth identification information. The eighth identification information is related to the fifth identification information, and the eighth identification information identifies a quantity of data units that are transmitted as a whole. The data units that are transmitted as a whole may include the second data unit. For example, the eighth identification information includes data packet group number (packet group number, PGN) identification information, where the PGN identification information identifies a quantity of data packets that are transmitted as a whole. It may be understood that a specific name of the PGN identification information is not limited in this embodiment of this application, the PGN identification information is merely a possible name, and any other information that can implement the foregoing functions should be understood as the PGN identification information in the solutions of this application.

Optionally, when the first data unit includes sixth identification information, the second data unit obtained by the user plane network element by performing protocol data encapsulation on the first data unit further includes ninth identification information. The ninth identification information is related to the sixth identification information. The ninth identification information identifies a frame, a slice, or a tile to which data units that are transmitted as a whole belong. The data units that are transmitted as a whole may include the second data unit. For example, the ninth identification information includes one or more of a data packet group frame identifier (packet group frame ID, PGFID), a data packet group slice identifier (packet group slice ID, PGSID), or a data packet group tile identifier (packet group tile ID, PGTID). The PGFID identifies a frame to which data packets that are transmitted as a whole belong, the PGSID identifies a slice to which data packets that are transmitted as a whole belong, and the PGTID identifies a tile to which data packets that are transmitted as a whole belong. It may be understood that a specific name of the PGFID, the PGSID, or the PGTID is not limited in this embodiment of this application, the PGFID, the PGSID, or the PGTID is merely a possible name, and any other information that can implement the foregoing functions should be understood as the PGFID, the PGSID, or the PGTID in the solutions of this application.

Optionally, when the first data unit includes seventh identification information, the second data unit obtained by the user plane network element by performing protocol data encapsulation on the first data unit further includes tenth identification information. The tenth identification information is related to the seventh identification information. The tenth identification information identifies a total size of data units that are transmitted as a whole. The data units that are transmitted as a whole may include the second data unit. For example, the tenth identification information includes data packet group bit size (packet group bit size, PGBS) identification information, where the PGBS identification information identifies a total bit size (which may alternatively be understood as a total quantity of bits) of data packets that are transmitted as a whole. It may be understood that a specific name of the PGBS identification information is not limited in this embodiment of this application, the PGBS identification information is merely a possible name, and any other information that can implement the foregoing functions should be understood as the PGBS identification information in the solutions of this application.

Part 640: In a possible implementation of part 640, the user plane network element sends the second data unit to the access network device. Correspondingly, the access network device receives the second data unit from the user plane network element, and obtains the third identification information and the fourth identification information in the second data unit.

Optionally, when the second data unit includes the eighth identification information, the access network device further obtains the eighth identification information in the second data unit. When the second data unit includes the ninth identification information, the access network device further obtains the ninth identification information in the second data unit. When the second data unit includes the tenth identification information, the access network device further obtains the tenth identification information in the second data unit.

It may be understood that the user plane network element may process the first data unit and/or send the second data unit based on one or more of the fifth identification information, the sixth identification information, or the seventh identification information included in the first data unit.

In a possible implementation, the user plane network element discards or sends a received data unit based on the fifth identification information. For example, the fifth identification information includes the integrity quantity identification information, where the integrity quantity identification information identifies a quantity of to-be-transmitted data packets that are transmitted as a whole (which is referred to as a quantity of to-be-transmitted data packets for short). The user plane network element compares a quantity of received data packets that are transmitted as a whole (which is referred to as a quantity of received data packets for short) with the quantity of to-be-transmitted data packets. When the quantity of the received data packets is less than the quantity of the to-be-transmitted data packets, the user plane network element discards the received data packets that are transmitted as a whole. When the quantity of received data packets is equal to the quantity of to-be-transmitted data packets, the user plane network element sends, to the access network device, the received data packets that are transmitted as a whole. In this implementation, data transmission that does not contribute to XR data experience can be reduced. Therefore, a waste of transmission resources is reduced and transmission resource usage efficiency is improved.

In another possible implementation, the user plane network element determines a sequence of transmitting data units based on the sixth identification information. For example, the sixth identification information includes one or more of the integrity frame identification information, the integrity slice identification information, or the integrity tile identification information. The user plane network element determines, based on one or more of the integrity frame identification information, the integrity slice identification information, or the integrity tile identification information, a sequence of sending data packets the access network device. In this implementation, data transmission scheduling can be optimized based on correlation of video frames, video slices, or video tiles, to improve user experience on XR data.

In another possible implementation, the user plane network element determines a priority of transmitting data units based on the seventh identification information (which may alternatively be understood as determining a preferentially transmitted data unit). For example, the seventh identification information includes the integrity size identification information. The user plane network element determines, based on the integrity size identification information, a priority of sending data packets to the access network device, in other words, determines data packets to be preferentially sent to the access network device. In this implementation, a data transmission requirement with a high priority can be met. Therefore, user experience on XR data is improved.

Part 650: The access network device obtains, based on the fourth identification information in the second data unit, QoS profile (profile) information corresponding to the second data unit.

Optionally, there is a second correspondence between the QoS profile information and the fourth identification information. That the access network device obtains, based on the fourth identification information in the second data unit, QoS profile information corresponding to the second data unit specifically includes: The access network device obtains, based on the fourth identification information in the second data unit and the second correspondence, the QoS profile information corresponding to the second data unit. In this manner, the QoS profile information can be obtained more conveniently.

The second correspondence may be predefined, or may be obtained by the access network device from a mobility management network element. The mobility management network element may obtain the second correspondence from the session management network element.

The QoS profile information may be predefined, or may be obtained by the access network device from the mobility management network element. The mobility management network element may obtain the QoS profile information from the session management network element.

In a possible implementation, the QoS profile information includes attribute information of the target transmission requirement, and the attribute information of the target transmission requirement indicates that there is the target transmission requirement. The target transmission requirement may be, for example, the integrity transmission requirement.

In another possible implementation, the QoS profile information includes a 5G QoS identifier (5G QoS identifier, 5QI) that indicates 5G QoS attribute information, the 5G QoS attribute information includes attribute information of the target transmission requirement, and the attribute information of the target transmission requirement indicates that there is the target transmission requirement. The target transmission requirement may be, for example, the integrity transmission requirement.

For example, the attribute information of the target transmission requirement may be integrity transmission indication information. The integrity transmission indication information indicates that integrity transmission needs to be performed on a corresponding QoS flow. It may be understood that a specific name of the integrity transmission indication information is not limited in this embodiment of this application, the integrity transmission indication information is merely a possible name, and any other information that can implement the foregoing functions should be understood as the integrity transmission indication information in the solutions of this application.

Optionally, the QoS profile information in this application may further include one or more of the following information: allocation and retention priority (allocation and retention priority, ARP) information, guaranteed flow bit rate (guaranteed flow bit rate, GFBR) information, maximum flow bit rate (maximum flow bit rate, MFBR) information, notification control information, maximum packet loss rate (maximum packet loss rate, MPLR) information, or reflective QoS attribute (reflective QoS attribute, RQA) information.

Optionally, the 5G QoS attribute information in this application may further include one or more of the following information: resource type information, priority information, packet delay budget (packet delay budget, PDB) information, packet error rate (packet error rate, PER) information, average window information, or maximum data burst volume information.

Part 660: The access network device outputs/sends the second data unit to a terminal based on the third identification information in the second data unit and the QoS profile information. Correspondingly, the terminal receives the second data unit.

In a possible implementation, when the QoS profile information indicates a target transmission requirement, the access network device performs integrity transmission on second data units having same third identification information.

The access network device may transmit the second data units having same third identification information by using a plurality of different integrity transmission methods.

In a possible transmission manner, the access network device transmits two or more second data units having same third identification information on a same radio bearer. In this manner, an access network can perform overall scheduling on the two or more second data units, to improve user experience on a video.

In another possible transmission manner, if two or more second data units have same third identification information, the access network device preferentially schedules these second data units. In this manner, an access network can set different priorities for different services, to improve user experience on multimedia services.

In another possible transmission manner, if two or more second data units have same third identification information, a part of the second data units are successfully transmitted, and a remaining part of the second data units fail to be transmitted, the access network device preferentially schedules a second data unit that fails to be transmitted. In this manner, it can be ensured, through scheduling, that a second data unit that fails to be transmitted can be preferentially transmitted reliably, to avoid a problem of invalid transmission of a second data unit that is successfully transmitted due to wrong transmission of a part of second data units.

According to the method, the access network device can implement, on an air interface, bound transmission of data that has a synchronization requirement or a dependency, to implement an effect of integrity transmission, improve network transmission efficiency, and improve user experience on an XR service.

In a possible implementation of part 640, the user plane network element sends at least two second data units to the access network device. The at least two second data units each include same third identification information, and the at least two second data units each include different fourth identification information. Correspondingly, the access network device receives the at least two second data units. Correspondingly, in part 650, the access network device obtains, based on the fourth identification information included in each of the at least two second data units, QoS profile information corresponding to each of the at least two second data units. The QoS profile information indicates, for example, the target transmission requirement. Correspondingly, in part 660, the access network device outputs/sends the at least two second data units to a terminal based on the third identification information included in each of the at least two second data units and the QoS profile information.

For example, the at least two second data units may be transmitted on a same radio bearer.

For example, the access network device receives two second data units U1 and U2 from the user plane network element. For example, the third identification information is a PGID and the fourth identification information is a QFI. The U1 and the U2 include same third identification information $PGID_0$. The U1 and the U2 respectively include fourth identification information $QFI_1$ and $QFI_2$, and the $QFI_1$ is different from the $QFI_2$. The $QFI_1$ corresponds to first QoS profile information, and the $QFI_2$ corresponds to second QoS profile information. The access network device obtains, based on the $QFI_1$, the first QoS profile information corresponding to the U1, where the first QoS profile information indicates a target transmission requirement. The access network device obtains, based on the $QFI_2$, the second QoS profile information corresponding to the U2, where the second QoS profile information also indicates the target transmission requirement. The access network device transmits the U1 and the U2 on a same radio bearer based on the same third identification information $PGID_0$ included in the U1 and the U2 and the target transmission requirement (for example, an integrity transmission requirement) indicated by the first QoS profile information and the second QoS profile information.

Optionally, when obtaining one or more of the eighth identification information, the ninth identification information, or the tenth identification information from the second data unit, the access network device outputs/sends the second data unit to the terminal based on one or more of the eighth identification information, the ninth identification information, or the tenth identification information.

In a possible implementation, the access network device discards or sends a received data unit based on the eighth identification information. For example, the eighth identification information includes the PGN identification information, and the PGN identification information identifies a quantity of to-be-transmitted data packets that are transmitted as a whole (which is referred to as a quantity of to-be-transmitted data packets for short). The access network device compares a quantity of received data packets that are transmitted as a whole (which is referred to as a quantity of received data packets for short) with the quantity of to-be-transmitted data packets. When the quantity of received data packets is less than the quantity of to-be-transmitted data packets, the access network device discards the received data packets that are transmitted as a whole. When the quantity of received data packets is equal to the quantity of to-be-transmitted data packets, the access network device sends, to the terminal, the received data packets that are transmitted as a whole. In this implementation, data transmission that does not contribute to XR data experience can be reduced. Therefore, a waste of transmission resources is reduced and transmission resource usage efficiency is improved.

In another possible implementation, the access network device determines a sequence of transmitting data units based on the ninth identification information. For example, the ninth identification information includes one or more of the PGFID, the PGSID, or the PGTID. The access network device determines, based on one or more of the PGFID, the PGSID, or the PGTID, a sequence of sending data packets to the terminal. In this implementation, data transmission scheduling can be optimized based on correlation of video frames, video slices, or video tiles, to improve user experience on XR data.

In another possible implementation, the access network device determines a priority of transmitting data units based on the tenth identification information (which may also be understood as determining a preferentially transmitted data unit). For example, the tenth identification information includes the PGBS identification information. The access network device determines, based on the PGBS identification information, a priority of sending data packets to the terminal, in other words, determines data packets to be preferentially sent to the terminal. In this implementation, a data transmission requirement with a high priority can be met. Therefore, user experience on XR data is improved.

Figure 7:
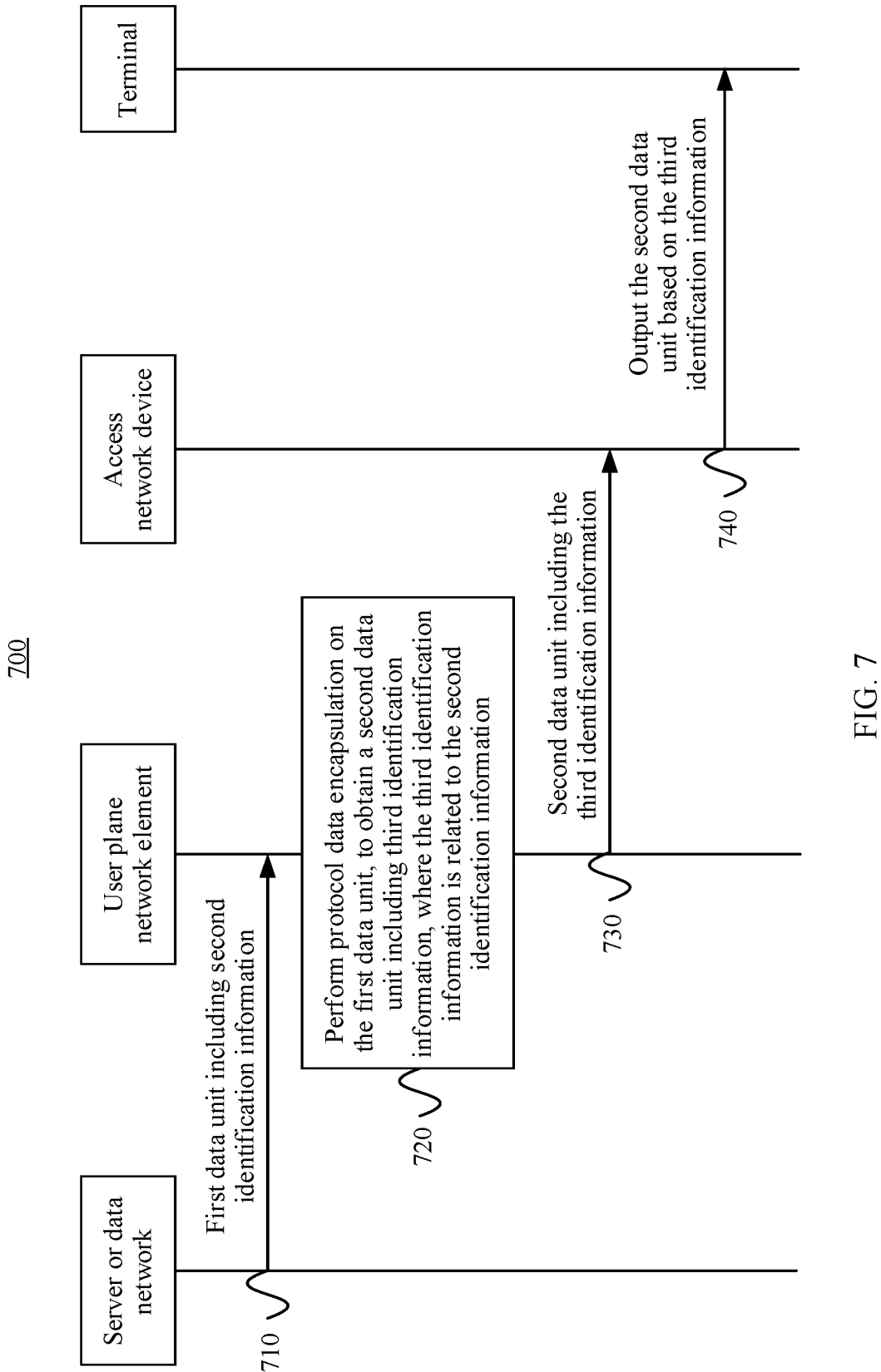
FIG. 7 is a schematic interaction diagram of another communication method according to this application.

FIG. 7 is a schematic interaction diagram of another communication method 700 according to an embodiment of this application. In FIG. 7, an example in which a server or a data network, a user plane network element, an access network device, and a terminal are used as execution bodies of the interaction diagram is used to illustrate the communication method. However, an execution body of the interaction diagram is not limited in this application. For example, the server in FIG. 7 may alternatively be a chip, a chip system, or a processor that supports the server in implementing the method, the user plane network element in FIG. 7 may alternatively be a chip, a chip system, or a processor that supports the user plane network element in implementing the method, the access network device in FIG. 7 may alternatively be a chip, a chip system, or a processor that supports the access network device in implementing the method, and the terminal in FIG. 7 may alternatively be a chip, a chip system, or a processor that supports the terminal in implementing the method. The method 700 shown in FIG. 7 includes a part 710 to a part 740. According to the method, integrity transmission can be performed on data or information that has a synchronization requirement or a dependency, to meet the synchronization requirement between the data or information. Therefore, user experience on an XR service is improved. The following describes the method 700 provided in this embodiment of this application.

Part 710: The server or the data network sends, to the user plane network element, a first data unit including second identification information. Correspondingly, the user plane network element receives the first data unit. Optionally, the first data unit is a data packet, and the data packet may be, for example, obtained after the server encodes and/or renders source data of XR. Optionally, the first data unit may further include one or more of first identification information, fifth identification information, sixth identification information, or seventh identification information. For the first identification information, the second identification information, the fifth identification information, the sixth identification information, and the seventh identification information, refer to the descriptions in the method 600. Details are not described herein again.

In a possible implementation, two or more first data units having same second identification information may correspond to data of a same picture frame. In this way, data information included in a plurality of first data units corresponding to a same picture frame may be subsequently transmitted as a whole on the access network device side. Therefore, user experience on a video picture is improved.

In another possible implementation, two or more first data units having same second identification information may correspond to a same piece of slice (slice) data or a same piece of tile (tile) data in a picture frame. In this way, the same piece of slice data or the same piece of tile data may be subsequently transmitted as a whole on the access network device side. Therefore, user experience on a video picture is improved.

In another possible implementation, two or more first data units having same second identification information may correspond to basic layer data and enhancement layer data of a same picture frame. In this way, data information included in a plurality of first data units corresponding to basic layer data and enhancement layer data of a same picture frame may be subsequently transmitted as a whole on the access network device side. Therefore, user experience on a video picture is improved.

In another possible implementation, two or more first data units having same second identification information may correspond to data of a picture frame and audio data synchronized with the picture frame. In this way, data information included in a plurality of first data units corresponding to data of a picture frame and audio data synchronized with the picture frame may be subsequently transmitted as a whole on the access network device side. Therefore, user experience on audio and video synchronization is improved.

In another possible implementation, two or more first data units having same second identification information may correspond to data of a same task, a same event, a same object, or a same type. For example, for a tactile internet, one or more of action information, tactile information, a picture frame, audio information, or the like may be used as data of a same task, a same event, a same object, or a same type. In this way, data information included in a plurality of first data units corresponding to data of a same task, a same event, a same object, or a same type may be subsequently transmitted as a whole on the access network device side. Therefore, user experience, for example, on a tactile internet service is improved.

Part 720: The user plane network element performs protocol data encapsulation on the first data unit, to obtain a second data unit including third identification information, where the third identification information is related to the second identification information. Optionally, the second data unit is a QoS flow. Optionally, the second data unit may further include one or more of fourth identification information, eighth identification information, ninth identification information, or tenth identification information. For the third identification information, the fourth identification information, the eighth identification information, the ninth identification information, and the tenth identification information, refer to the descriptions in the method 600. Details are not described herein again.

The third identification information in the second data unit is related to the second identification information in the first data unit. It may be understood as that the third identification information is set based on the second identification information. In a possible implementation, second data units obtained by performing protocol data encapsulation on first data units having same second identification information have same third data identifiers.

For example, two or more first data units having same second identification information may correspond to data of a same picture frame. The second data units obtained by performing protocol data encapsulation on these first data units may include same third identification information. Data information included in these second data units including same third identification information is subsequently transmitted as a whole on the access network device side. Therefore, user experience on a video picture is improved.

For another example, two or more first data units having same second identification information may correspond to a same piece of slice (slice) data or a same piece of tile (tile) data in a picture frame. The second data units obtained by performing protocol data encapsulation on these first data units may include same third identification information. Data information included in these second data units including same third identification information is subsequently transmitted as a whole on the access network device side. Therefore, user experience on a video picture is improved.

For another example, two or more first data units having same second identification information may correspond to basic layer data and enhancement layer data of a same picture frame. The second data units obtained by performing protocol data encapsulation on these first data units may include same third identification information. Data information included in these second data units including same third identification information is subsequently transmitted as a whole on the access network device side. Therefore, user experience on a video picture is improved.

For another example, two or more first data units having same second identification information may correspond to data of a picture frame and audio data synchronized with the picture frame. The second data units obtained by performing protocol data encapsulation on these first data units may include same third identification information. Data information included in these second data units including same third identification information is subsequently transmitted as a whole on the access network device side. Therefore, user experience on audio and video synchronization is improved.

For another example, two or more first data units having same second identification information may correspond to data of a same task, a same event, a same object, or a same type.

The second data units obtained by performing protocol data encapsulation on these first data units may include same third identification information. Data information included in these second data units including same third identification information is subsequently transmitted as a whole on the access network device side. Therefore, user experience, for example, on a tactile internet service is improved.

Part 730: The user plane network element sends the second data unit to an access network device. Correspondingly, the access network device receives the second data unit from the user plane network element, and obtains the third identification information in the second data unit.

Optionally, when the second data unit includes the eighth identification information, the access network device further obtains the eighth identification information in the second data unit. When the second data unit includes the ninth identification information, the access network device further obtains the ninth identification information in the second data unit. When the second data unit includes the tenth identification information, the access network device further obtains the tenth identification information in the second data unit.

It may be understood that the user plane network element may process the first data unit and/or send the second data unit based on one or more of the fifth identification information, the sixth identification information, or the seventh identification information included in the first data unit. For detailed implementation, refer to the descriptions in the method 600. Details are not described herein again.

Part 740: The access network device outputs/sends the second data unit to a terminal based on the third identification information in the second data unit. Correspondingly, the terminal receives the second data unit.

In a possible implementation, the access network device performs integrity transmission on second data units having same third identification information.

The access network device may transmit the second data units having same third identification information by using a plurality of different integrity transmission methods.

In a possible transmission manner, the access network device transmits two or more second data units having same third identification information on a same radio bearer. In this manner, an access network can perform overall scheduling on the two or more second data units, to improve user experience on a video.

In another possible transmission manner, if two or more second data units have same third identification information, the access network device preferentially schedules these second data units. In this manner, an access network can set different priorities for different services, to improve user experience on multimedia services.

In another possible transmission manner, if two or more second data units have same third identification information, a part of the second data units are successfully transmitted, and a remaining part of the second data units fail to be transmitted, the access network device preferentially schedules a second data unit that fails to be transmitted. In this manner, it can be ensured, through scheduling, that a second data unit that fails to be transmitted can be preferentially transmitted reliably, to avoid a problem of invalid transmission of a second data unit that is successfully transmitted due to wrong transmission of a part of second data units.

According to the method, the access network device can implement, on an air interface, bound transmission of data that has a synchronization requirement or a dependency, to implement an effect of integrity transmission, improve network transmission efficiency, and improve user experience on an XR service.

In a possible implementation of part 730, the user plane network element sends at least two second data units to the access network device, and the at least two second data units each include same third identification information. Correspondingly, the access network device receives the at least two second data units. Correspondingly, in part 740, the access network device outputs/sends the at least two second data units to a terminal based on the third identification information included in each of the at least two second data units. For example, the at least two second data units may be transmitted on a same radio bearer.

For example, the access network device receives two second data units U1 and U2 from the user plane network element. For example, the third identification information is a PGID. The U1 and the U2 include same third identification information $PGID_0$. The access network device transmits, based on the same third identification information $PGID_0$ included in the U1 and the U2, the U1 and the U2 on a same radio bearer.

Optionally, when obtaining one or more of the eighth identification information, the ninth identification information, or the tenth identification information from the second data unit, the access network device outputs/sends the second data unit to the terminal based on one or more of the eighth identification information, the ninth identification information, or the tenth identification information. For detailed implementation, refer to the descriptions in the method 600. Details are not described herein again.

Corresponding to the methods provided in the foregoing method embodiments, an embodiment of this application further provides a corresponding apparatus. The apparatus includes a corresponding module configured to perform the foregoing embodiments. The module may be software, hardware, or a combination of software and hardware.

Figure 8:
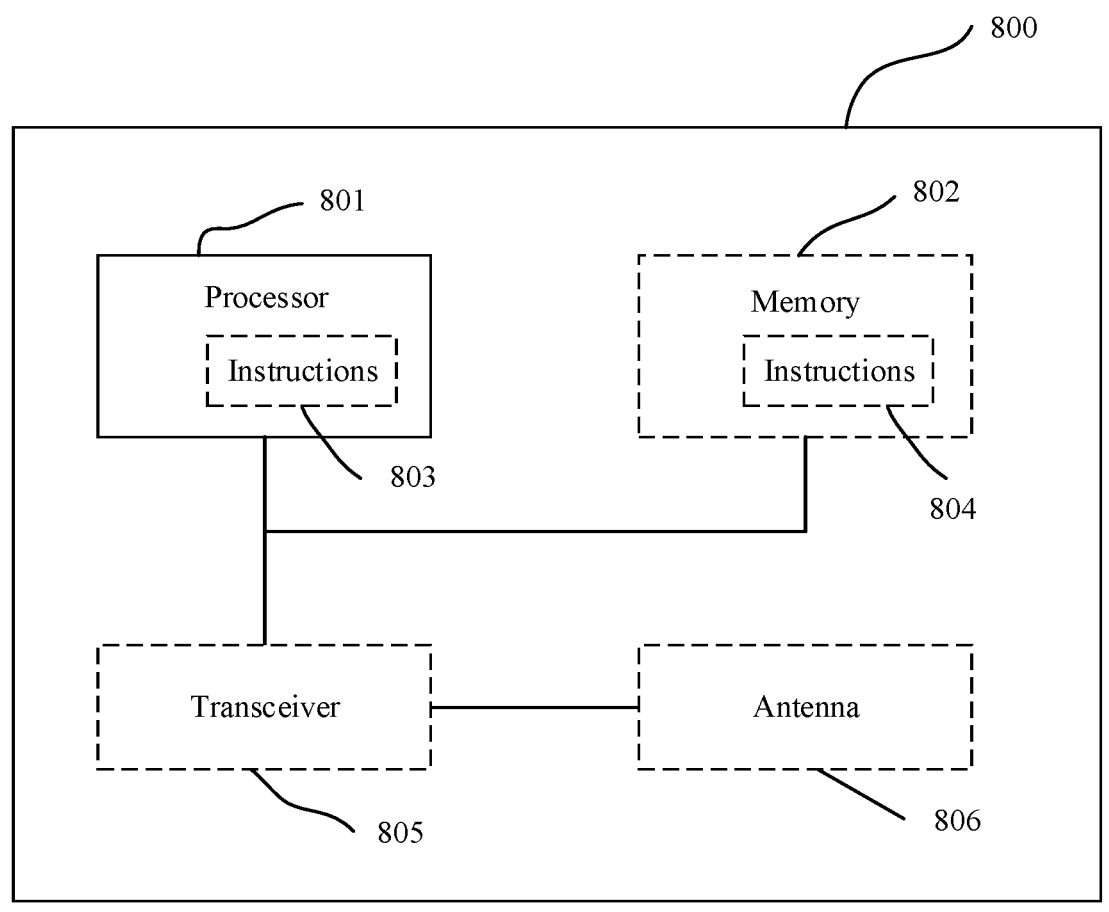
FIG. 8 is a schematic diagram of a structure of a communication apparatus according to an embodiment of this application.

FIG. 8 is a schematic diagram of a structure of an apparatus. The apparatus 800 may be a network device; or may be a terminal device; or may be a chip, a chip system, a processor, or the like that supports a network device in implementing the foregoing methods; or may be a chip, a chip system, a processor, or the like that supports a terminal device in implementing the foregoing methods. The apparatus may be configured to implement the methods described in the foregoing method embodiments. For details, refer to the descriptions in the foregoing method embodiments.

The apparatus 800 may include one or more processors 801. The processor 801 may also be referred to as a processing unit, and may implement a specific control function. The processor 801 may be a general-purpose processor, a dedicated processor, or the like. For example, the processor 801 may be a baseband processor or a central processing unit. The baseband processor may be configured to process a communication protocol and communication data. The central processing unit may be configured to: control a communication apparatus (for example, a base station, a baseband chip, a terminal, a terminal chip, a DU, or a CU), execute a software program, and process data of the software program.

In an optional design, the processor 801 may also store instructions and/or data 803.

The instructions and/or data 803 may be run by the processor, so that the apparatus 800 performs the methods described in the foregoing method embodiments.

In another optional design, the processor 801 may include a transceiver unit configured to implement receiving and sending functions. For example, the transceiver unit may be a transceiver circuit, an interface, or an interface circuit. The transceiver circuit, the interface, or the interface circuit configured to implement receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In another possible design, the apparatus 800 may include a circuit. The circuit may implement sending, receiving, or communication functions in the foregoing method embodiments.

Optionally, the apparatus 800 may include one or more memories 802. The memory stores instructions 804, and the instructions may be run on the processor, so that the apparatus 800 performs a method described in the foregoing method embodiments. Optionally, the memory may further store data. Optionally, the processor may also store instructions and/or data. The processor and the memory may be separately disposed, or may be integrated together. For example, the correspondence described in the foregoing method embodiments may be stored in the memory or stored in the processor.

Optionally, the apparatus 800 may further include a transceiver 805 and/or an antenna 806. The processor 801 may be referred to as a processing unit, and controls the apparatus 800. The transceiver 805 may be referred to as a transceiver unit, a transceiver machine, a transceiver circuit, a transceiver apparatus, a transceiver module, or the like, and is configured to implement sending and receiving functions.

Optionally, the apparatus 800 in this embodiment of this application may be configured to perform the method described in FIG. 6 or FIG. 7 in embodiments of this application.

The processor and the transceiver described in this application may be implemented in an integrated circuit (integrated circuit, IC), an analog IC, a radio frequency integrated circuit RFIC, a mixed signal IC, an application-specific integrated circuit (application-specific integrated circuit, ASIC), a printed circuit board (printed circuit board, PCB), an electronic device, or the like. The processor and the transceiver may also be manufactured by using various IC technologies, for example, a complementary metal oxide semiconductor (complementary metal oxide semiconductor, CMOS), an N-type metal oxide semiconductor (nMetal-oxide-semiconductor, NMOS), a positive channel metal oxide-semiconductor (positive channel metal oxide semiconductor, PMOS), a bipolar junction transistor (Bipolar Junction Transistor, BJT), a bipolar CMOS (BiCMOS), silicon germanium (SiGe), and gallium arsenide (GaAs).

The apparatus described in the foregoing embodiments may be a network device or a terminal device. However, a range of the apparatus described in this application is not limited thereto, and a structure of the apparatus may not be limited to FIG. 8. The apparatus may be an independent device, or may be a part of a larger device. For example, the apparatus may be:

(1) an independent integrated circuit IC, a chip, or a chip system or subsystem;

(2) a set of one or more ICs, where optionally, the IC set may also include a storage component configured to store data and/or instructions;

(3) an ASIC, for example, a modem (MSM);

(4) a module that can be embedded in another device;

(5) a receiver, a terminal, an intelligent terminal, a cellular phone, a wireless device, a handheld device, a mobile unit, a vehicle-mounted device, a network device, a cloud device, an artificial intelligence device, a machine device, a home device, a medical device, an industrial device, or the like; or (6) others.

Figures 9, 10:
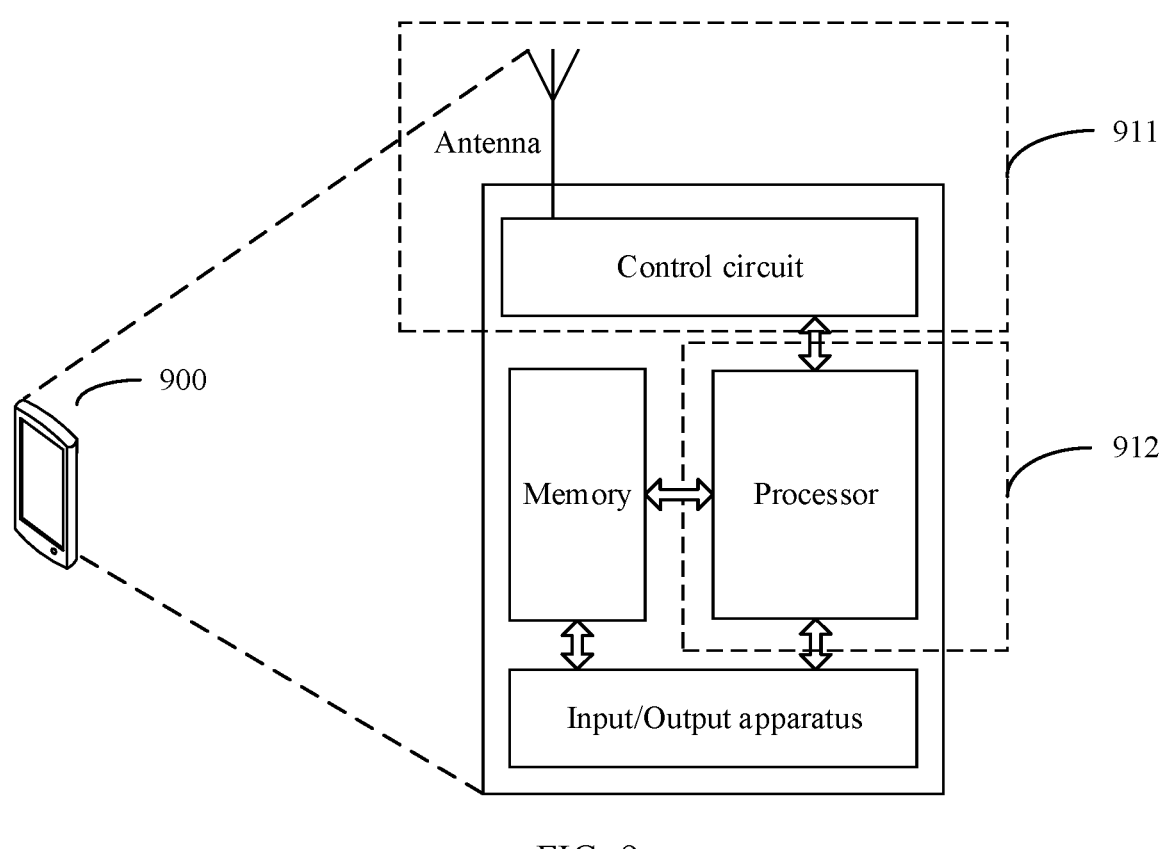
FIG. 9 is a schematic diagram of a structure of a terminal according to an embodiment of this application.
FIG. 10 is a schematic diagram of another communication apparatus according to an embodiment of this application.

FIG. 9 is a schematic diagram of a structure of a terminal device. The terminal device may be applied to the scenario shown in FIG. 1, FIG. 2, FIG. 3, FIG. 4, or FIG. 5. For ease of description, FIG. 9 only shows main components of the terminal device. As shown in FIG. 9, the terminal device 900 includes a processor, a memory, a control circuit, an antenna, and an input/output apparatus. The processor is mainly configured to process a communication protocol and communication data, control the entire terminal, execute a software program, and process data of the software program. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user.

After the terminal device is powered on, the processor may read a software program in a storage unit, parse and execute instructions of the software program, and process data of the software program. When data needs to be sent in a wireless manner, the processor performs baseband processing on the to-be-sent data, and outputs a baseband signal to the radio frequency circuit. The radio frequency circuit processes the baseband signal to obtain a radio frequency signal, and sends the radio frequency signal to the outside in an electromagnetic wave form by using the antenna. When data is sent to the terminal device, the radio frequency circuit receives a radio frequency signal by using the antenna, further converts the radio frequency signal into a baseband signal, and outputs the baseband signal to the processor. The processor converts the baseband signal into data, and processes the data.

For ease of description, FIG. 9 shows only one memory and one processor. In an actual terminal device, there may be a plurality of processors and memories. The memory may also be referred to as a storage medium, a storage device, or the like. This is not limited in this embodiment of the present disclosure.

In an optional implementation, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 9 integrates functions of the baseband processor and the central processing unit. A person skilled in the art may understand that the baseband processor and the central processing unit may alternatively be independent processors, and are interconnected by using a technology such as a bus. A person skilled in the art may understand that the terminal device may include a plurality of baseband processors to adapt to different network standards, and the terminal device may include a plurality of central processing units to enhance processing capabilities of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program, and the processor executes the software program to implement a baseband processing function.

In an example, the antenna and the control circuit that have receiving and sending functions may be considered as a transceiver unit 911 of the terminal device 900, and the processor having a processing function may be considered as a processing unit 912 of the terminal device 900. As shown in FIG. 9, the terminal device 900 includes a transceiver unit 911 and a processing unit 912. The transceiver unit may also be referred to as a transceiver machine, a transceiver, a transceiver apparatus, or the like. Optionally, a component that is in the transceiver unit 911 and that is configured to implement a receiving function may be considered as a receiving unit, and a component that is in the transceiver unit 911 and that is configured to implement a sending function may be considered as a sending unit. That is, the transceiver unit 911 includes the receiving unit and the sending unit. For example, the receiving unit may also be referred to as a receiver, a receive machine, or a receiving circuit, and the sending unit may also be referred to as a transmitter, a transmit machine, or a transmitting circuit. Optionally, the receiving unit and the sending unit may be one integrated unit, or may be a plurality of independent units. The receiving unit and the sending unit may be in one geographical position, or may be distributed in a plurality of geographical positions.

As shown in FIG. 10, another embodiment of this application provides an apparatus 1000. The apparatus may be a terminal, or may be a component (for example, an integrated circuit or a chip) of the terminal. Alternatively, the apparatus may be a network device, or may be a component (for example, an integrated circuit or a chip) of the network device. Alternatively, the apparatus may be another communication module configured to implement the methods in the method embodiments of this application. The apparatus 1000 may include a processing module 1002 (or referred to as a processing unit). Optionally, the apparatus 1000 may further include a transceiver module 1001 (or referred to as a transceiver unit) and a storage module 1003 (or referred to as a storage unit).

In a possible design, one or more modules in FIG. 10 may be implemented by one or more processors, or may be implemented by one or more processors and memories, or may be implemented by one or more processors and transceivers, or may be implemented by one or more processors, memories, and transceivers. This is not limited in embodiments of this application. The processor, the memory, and the transceiver may be disposed separately, or may be integrated.

The apparatus has a function of implementing the terminal described in embodiments of this application. For example, the apparatus includes a corresponding module, unit, or means (means) used for the terminal to perform the steps that are related to the terminal and that are described in embodiments of this application. The function, the unit, or the means (means) may be implemented by software or hardware, may be implemented by hardware executing corresponding software, or may be implemented by a combination of software and hardware. For details, refer to the corresponding descriptions in the foregoing corresponding method embodiments. Alternatively, the apparatus has a function of implementing the network device described in embodiments of this application. For example, the apparatus includes a corresponding module, unit, or means (means) used for the network device to perform the steps that are related to the network device and that are described in embodiments of this application. The function, the unit, or the means (means) may be implemented by software or hardware, may be implemented by hardware executing corresponding software, or may be implemented by a combination of software and hardware. For details, refer to the corresponding descriptions in the foregoing corresponding method embodiments.

Optionally, modules in the apparatus 1000 in this embodiment of this application may be configured to perform the method described in FIG. 6 or FIG. 7 in embodiments of this application.

In a possible design, the apparatus 1000 may include a processing module 1002 and a transceiver module 1001. The transceiver module 1001 is configured to receive a first data unit from a server or a data network, where the first data unit includes first identification information and second identification information. The processing module 1002 is configured to: obtain, based on the first identification information, a target transmission requirement corresponding to the first data unit, and perform protocol data encapsulation on the first data unit based on the target transmission requirement, to obtain a second data unit including third identification information, where the third identification information is related to the second identification information. The transceiver module 1001 is further configured to send the second data unit to an access network device.

According to the apparatus, integrity transmission can be performed on data or information that has a synchronization requirement or a dependency, to meet the synchronization requirement between the data or information. Therefore, user experience on an XR service is improved.

In some possible implementations of the apparatus 1000, there is a first correspondence between the target transmission requirement and the first identification information.

In some possible implementations of the apparatus 1000, the first correspondence is predefined, or the first correspondence is obtained from a session management network element.

In some possible implementations of the apparatus 1000, the first correspondence is included in a PDR.

In some possible implementations of the apparatus 1000, that the processing module 1002 is configured to obtain, based on the first identification information, a target transmission requirement corresponding to the first data unit specifically includes: The processing module 1002 is configured to obtain the target transmission requirement based on the first identification information and the first correspondence.

In some possible implementations of the apparatus 1000, the second data unit further includes fourth identification information. Optionally, the fourth identification information includes a QFI.

In some possible implementations of the apparatus 1000, the first identification information includes PFD information.

In some possible implementations of the apparatus 1000, the second identification information includes integrity index information.

In some possible implementations of the apparatus 1000, the third identification information includes a data packet group identifier.

In some possible implementations of the apparatus 1000, the second data unit includes protocol header information, and the third identification information is included in the protocol header information. Optionally, the protocol header information is GTP header information.

In some possible implementations of the apparatus 1000, the target transmission requirement includes an integrity transmission requirement.

In another possible design, the apparatus 1000 may include a processing module 1002 and a transceiver module 1001. The transceiver module 1001 is configured to receive a second data unit from a user plane network element. The processing module 1002 is configured to: obtain third identification information and fourth identification information in the second data unit, and obtain, based on the fourth identification information, QoS profile information corresponding to the second data unit. The processing module 1002 is further configured to output/send the second data unit based on the third identification information and the QoS profile information.

According to the apparatus, an access network device can implement, on an air interface, bound transmission of data that has a synchronization requirement or a dependency, to implement an effect of integrity transmission, improve network transmission efficiency, and improve user experience on an XR service.

In some possible implementations of the apparatus 1000, that the transceiver module 1001 is configured to receive a second data unit from a user plane network element specifically includes: The transceiver module 1001 is configured to receive at least two second data units from the user plane network element, where the at least two second data units each include same third identification information, and the at least two second data units each further include different fourth identification information. That the processing module 1002 is configured to obtain, based on the fourth identification information, QoS profile information corresponding to the second data unit, and output/send the second data unit based on the third identification information and the QoS profile information specifically includes: The processing module 1002 is configured to: obtain, based on the fourth identification information included in each of the at least two second data units, QoS profile information corresponding to each of the at least two second data units, and output/send the at least two second data units based on the third identification information and the QoS profile information. Optionally, the processing module 1002 is configured to transmit the at least two second data units on a same radio bearer.

In some possible implementations of the apparatus 1000, the QoS profile information includes attribute information of a target transmission requirement, and the attribute information of the target transmission requirement indicates that there is the target transmission requirement. Optionally, the target transmission requirement includes an integrity transmission requirement.

In some possible implementations of the apparatus 1000, the QoS profile information includes a 5QI, the 5QI indicates 5G QoS attribute information, the 5G QoS attribute information includes attribute information of a target transmission requirement, and the attribute information of the target transmission requirement indicates that there is the target transmission requirement. Optionally, the target transmission requirement includes an integrity transmission requirement.

In some possible implementations of the apparatus 1000, the third identification information includes a data packet group identifier.

In some possible implementations of the apparatus 1000, the second data unit includes protocol header information, and the third identification information is included in the protocol header information. Optionally, the protocol header information is GTP header information.

In some possible implementations of the apparatus 1000, the fourth identification information includes a QFI.

In another possible design, the apparatus 1000 may include a processing module 1002 and a transceiver module 1001. The transceiver module 1001 is configured to receive a first data unit from a server or a data network, where the first data unit includes second identification information. The processing module 1002 is configured to perform protocol data encapsulation on the first data unit to obtain a second data unit including third identification information, where the third identification information is related to the second identification information. The transceiver module 1001 is further configured to send the second data unit to an access network device. Optionally, the first data unit may further include first identification information. Optionally, the second data unit may further include fourth identification information.

According to the apparatus, integrity transmission can be performed on data or information that has a synchronization requirement or a dependency, to meet the synchronization requirement between the data or information. Therefore, user experience on an XR service is improved.

In some possible implementations of the apparatus 1000, the first identification information includes PFD information.

In some possible implementations of the apparatus 1000, the second identification information includes integrity index information.

In some possible implementations of the apparatus 1000, the third identification information includes a data packet group identifier.

In some possible implementations of the apparatus 1000, the fourth identification information includes a QFI.

In some possible implementations of the apparatus 1000, the second data unit includes protocol header information, and the third identification information is included in the protocol header information. Optionally, the protocol header information is GTP header information.

In some possible implementations of the apparatus 1000, the target transmission requirement includes an integrity transmission requirement.

In another possible design, the apparatus 1000 may include a processing module 1002 and a transceiver module 1001. The transceiver module 1001 is configured to receive a second data unit from a user plane network element, where the second data unit includes third identification information. The processing module 1002 is configured to output/send the second data unit based on the third identification information in the second data unit. Optionally, the second data unit may further include fourth identification information.

According to the apparatus, an access network device can implement, on an air interface, bound transmission of data that has a synchronization requirement or a dependency, to implement an effect of integrity transmission, improve network transmission efficiency, and improve user experience on an XR service.

In some possible implementations of the apparatus 1000, that the transceiver module 1001 is configured to receive a second data unit from a user plane network element specifically includes: The transceiver module 1001 is configured to receive at least two second data units from the user plane network element, where the at least two second data units each include same third identification information. That the processing module 1002 is configured to output/send the second data unit based on the third identification information in the second data unit specifically includes: The processing module 1002 is configured to output/send the at least two second data units based on the third identification information included in each of the at least two second data units. Optionally, the processing module 1002 is configured to transmit the at least two second data units on a same radio bearer.

In some possible implementations of the apparatus 1000, the third identification information includes a data packet group identifier.

In some possible implementations of the apparatus 1000, the fourth identification information includes a QFI.

In some possible implementations of the apparatus 1000, the second data unit includes protocol header information, and the third identification information is included in the protocol header information. Optionally, the protocol header information is GTP header information.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, the apparatus provided in embodiments of this application may also correspondingly implement these features or functions. Details are not described herein.

A person skilled in the art may further understand that various illustrative logical blocks (illustrative logical blocks) and steps (steps) that are listed in embodiments of this application may be implemented by electronic hardware, computer software, or a combination thereof. Whether the functions are implemented by hardware or software depends on particular applications and a design requirement of the entire system. A person skilled in the art may use various methods to implement the functions for corresponding application, but it should not be considered that the implementation goes beyond the scope of embodiments of this application.

It may be understood that, the processor in embodiments of this application may be an integrated circuit chip, and has a signal processing capability. In an implementation process, steps in the foregoing method embodiments can be implemented by using a hardware integrated logical circuit in the processor, or by using instructions in a form of software. The foregoing processor may be a general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, or a discrete hardware component.

The solutions described in this application may be implemented in various manners. For example, the technologies may be implemented by hardware, software, or a combination thereof. For hardware implementation, a processing unit configured to perform these technologies at a communication apparatus (for example, a base station, a terminal, a network entity, or a chip) may be implemented in one or more general-purpose processors, a DSP, a digital signal processor, an ASIC, a programmable logic device, an FPGA or another programmable logic apparatus, a discrete gate or transistor logic device, a discrete hardware component, or any combination thereof.

The general-purpose processor may be a microprocessor. Optionally, the general-purpose processor may also be any conventional processor, controller, microcontroller, or state machine. The processor may also be implemented by a combination of computing apparatuses, for example, a digital signal processor and a microprocessor, a plurality of microprocessors, one or more microprocessors with a digital signal processor core, or any other similar configuration.

It may be understood that the memory in embodiments of this application may be a transitory memory or a non-transitory memory, or may include a transitory memory and a non-transitory memory. The non-transitory memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The transitory memory may be a random access memory (random access memory, RAM), used as an external cache. By way of example and not limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the system and methods described in this specification includes but is not limited to these memories and any memory of another proper type.

This application further provides a computer-readable medium storing a computer program. When the computer program is executed by a computer, functions of any one of the foregoing method embodiments are implemented.

This application further provides a computer program product. When the computer program product is executed by a computer, functions of any one of the foregoing method embodiments are implemented.

All or some of the foregoing embodiments may be implemented by software, hardware, firmware, or any combination thereof. When software is used to implement the foregoing embodiments, all or some of the foregoing embodiments may be implemented in a form of a computer program product. The computer program product includes one or more computer instructions. When the computer instructions are loaded and executed on the computer, the procedure or functions according to the foregoing embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid-state drive, SSD)), or the like.

It may be understood that "an embodiment" mentioned in the specification means that particular features, structures, or characteristics related to the embodiment are included in at least one embodiment of this application. Therefore, embodiments in the entire specification do not necessarily refer to a same embodiment. In addition, these particular features, structures, or characteristics may be combined in one or more embodiments in any appropriate manner. It may be understood that sequence numbers of the foregoing processes do not mean an execution sequence in various embodiments of this application. The execution sequence of the processes should be determined based on functions and internal logic of the processes, and should not be construed as any limitation on the implementation processes of embodiments of this application.

It should be understood that, in this application, "when" and "if" mean that an apparatus performs corresponding processing in an objective situation, and are not intended to limit time. The terms do not mean that the apparatus is required to have a determining action during implementation, and do not mean any other limitation.

"Simultaneously" in this application may be understood as being at a same time point, may be understood as being within a time period, or may be understood as being within a same periodicity.

A person skilled in the art may understand that various numbers such as "first" and "second" in this application are merely used for differentiation for ease of description, and are not used to limit the scope of embodiments of this application. A specific value of a number (which may also be referred to as an index), a specific value of a quantity, and a position in this application are merely used as examples, but are not unique representation forms, and are not used to limit the scope of embodiments of this application. Various numbers such as "first" and "second" in this application are merely used for differentiation for ease of description, and are not used to limit the scope of embodiments of this application.

In this application, an element represented in a singular form is intended to represent "one or more", but does not represent "one and only one", unless otherwise specified. In this application, unless otherwise specified, "at least one" is intended to represent "one or more", and "a plurality of" is intended to represent "two or more".

In addition, the terms "system" and "network" may be used interchangeably in this specification. The term "and/or" in this specification describes only an association relationship between associated objects and represents that three relationships may exist. For example, A and/or B may represent the following three cases: only A exists, both A and B exist, and only B exists. A may be singular or plural, and B may be singular or plural. The character "/" generally indicates an "or" relationship between the associated objects.

The term "at least one of" in this specification indicates all combinations or any combination of listed items. For example, "at least one of A, B, and C" may indicate the following six cases: only A exists, only B exists, only C exists, A and B coexist, B and C coexist, and A, B, and C coexist. A may be singular or plural, B may be singular or plural, and C may be singular or plural.

It should be understood that in embodiments of this application, "B corresponding to A" represents that B is associated with A, and B may be determined based on A. However, it should be further understood that determining B based on A does not mean that B is determined based only on A. B may alternatively be determined based on A and/or other information.

The correspondences shown in the tables in this application may be configured, or may be predefined. Values of the information in the tables are merely examples, and other values may be configured. This is not limited in this application. When a correspondence between the information and the parameters is configured, not all the correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-negotiate", "pre-configure", "solidify", or "pre-burn".

A person of ordinary skill in the art may understand that units and algorithm steps in the examples described with reference to embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person of ordinary skill in the art may understand that, for the purpose of convenient and brief description, for a detailed working process of the foregoing system, apparatuses, and units, refer to a corresponding process in the foregoing method embodiments. Details are not described herein again.

It may be understood that the system, apparatuses, and methods described in this application may alternatively be implemented in another manner. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each unit may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

For same or similar parts in embodiments of this application, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method based on an internal logical relationship thereof. The foregoing descriptions are implementations of this application, but are not intended to limit the protection scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A communication method, comprising:
receiving a plurality of first data units from a server or a data network, wherein each of the plurality of first data units comprises first identification information and second identification information, wherein the plurality of first data units have the same second identification information and correspond to data of a same picture frame, a same piece of slice data or a same piece of title data;
performing protocol data encapsulation on the plurality of first data units based on the target transmission requirement, to obtain a plurality of second data units that each comprise third identification information, wherein the third identification information is based on the second identification information such that the plurality of second data units having the same third identification information correspond to data of the same picture frame, the same piece of slice data or the same piece of title data; and
sending the plurality of second data units to an access network device.

2. The method according to claim 1, the method further comprising:
obtaining, based on the first identification information, a target transmission requirement corresponding to the plurality of first data units;
wherein the target transmission requirement is obtained based on the first identification information and a first correspondence between the target transmission requirement and the first identification information.

3. The method according to claim 2, wherein the first correspondence is comprised in a data packet detection rule (PDR).

4. The method according to claim 1, wherein each of the plurality of second data units further comprises fourth identification information, and the fourth identification information comprises a quality of service flow identifier (QFI).

5. The method according to claim 1, wherein the first identification information comprises packet flow description (PFD) information.

6. The method according to claim 1, wherein the second identification information comprises integrity index information.

7. The method according to claim 6, wherein the plurality of first data units comprise same integrity index information;

wherein the third identification information comprises at least one of: a data packet group frame identifier (PGFID), a data packet group slice identifier (PGSID), or a data packet group title identifier (PGTID).

8. An apparatus, comprising:
one or more processors; and
a memory coupled to the one or more processors and configured to store instructions that, when executed by the one or more processors, cause the apparatus to:
receive a plurality of first data units from a server or a data network, wherein each of the plurality of first data units comprises first identification information and second identification information, wherein the plurality of first data units have the same second identification information and correspond to data of a same picture frame, a same piece of slice data or a same piece of title data;
perform protocol data encapsulation on the plurality of first data units based on the target transmission requirement, to obtain a plurality of second data units that each comprise third identification information, wherein the third identification information is based on the second identification information such that the plurality of second data units having the same third identification information correspond to data of the same picture frame, the same piece of slice data or the same piece of title data; and
send the plurality of second data units to an access network device.

9. The apparatus according to claim 8, wherein the apparatus is further caused to obtain, based on the first identification information, a target transmission requirement corresponding to the plurality of first data units;
wherein the target transmission requirement is obtained based on the first identification information and a first correspondence between the target transmission requirement and the first identification information.

10. The apparatus according to claim 9, wherein the first correspondence is comprised in a data packet detection rule (PDR).

11. The apparatus according to claim 8, wherein each of the plurality of second data units further comprises fourth identification information, and the fourth identification information comprises a quality of service flow identifier (QFI).

12. The apparatus according to claim 8, wherein the first identification information comprises packet flow description (PFD) information.

13. The apparatus according to claim 8, wherein the second identification information comprises integrity index information.

14. The apparatus according to claim 13, wherein the plurality of first data units comprise same integrity index information;
wherein the third identification information comprises at least one of: a data packet group frame identifier (PGFID), a data packet group slice identifier (PGSID), or a data packet group title identifier (PGTID).

15. A non-transitory computer readable medium storing instructions that are executable by a computer, and the instructions comprise instructions for:
receiving a plurality of first data units from a server or a data network, wherein each of the plurality of first data units comprises first identification information and second identification information, wherein the plurality of first data units have the same second identification information and correspond to data of a same picture frame, a same piece of slice data or a same piece of title data;

performing protocol data encapsulation on the plurality of first data units based on the target transmission requirement, to obtain a plurality of second data units that each comprise third identification information, wherein the third identification information is based on the second identification information such that the plurality of second data units having the same third identification information correspond to data of the same picture frame, the same piece of slice data or the same piece of title data; and sending the plurality of second data units to an access network device.

16. The non-transitory computer readable medium according to claim 15, the instructions further comprise instructions for: obtaining, based on the first identification information, a target transmission requirement corresponding to the plurality of first data units;

wherein the target transmission requirement is obtained based on the first identification information and a first correspondence between the target transmission requirement and the first identification information.

17. The non-transitory computer readable medium according to claim 16, wherein the first correspondence is comprised in a data packet detection rule (PDR).

18. The non-transitory computer readable medium according to claim 15, wherein the first identification information comprises packet flow description (PFD) information.

19. The non-transitory computer readable medium according to claim 15, wherein the plurality of first data units comprise same integrity index information as the second identification information;

wherein the third identification information comprises at least one of: a data packet group frame identifier (PGFID), a data packet group slice identifier (PGSID), or a data packet group title identifier (PGTID).

* * * * *